United States Patent
Huebner

(10) Patent No.: US 7,874,681 B2
(45) Date of Patent: Jan. 25, 2011

(54) INTERACTIVE PROJECTOR SYSTEM AND METHOD

(76) Inventor: Kenneth J. Huebner, 9102 N. 75 St., Apt. 3B, Milwaukee, WI (US) 53233

( * ) Notice: Subject to any disclaimer, the term of this patent is extended or adjusted under 35 U.S.C. 154(b) by 595 days.

(21) Appl. No.: 11/867,913

(22) Filed: Oct. 5, 2007

(65) Prior Publication Data

US 2009/0091710 A1    Apr. 9, 2009

(51) Int. Cl.
 *G03B 21/14* (2006.01)
(52) U.S. Cl. ............................. 353/28; 353/30
(58) Field of Classification Search ................ 353/28, 353/30, 46, 69
See application file for complete search history.

(56) References Cited

U.S. PATENT DOCUMENTS

| | | |
|---|---|---|
| 6,346,933 B1 | 2/2002 | Lin |
| 6,382,798 B1 | 5/2002 | Habraken |
| 6,554,431 B1 | 4/2003 | Binsted et al. |
| 6,618,076 B1 | 9/2003 | Sukthankar et al. |
| 6,733,138 B2 | 5/2004 | Raskar |
| 6,764,185 B1 | 7/2004 | Beardsley et al. |
| 6,834,965 B2 | 12/2004 | Raskar et al. |
| 6,840,627 B2 | 1/2005 | Olbrich |
| 6,984,039 B2 | 1/2006 | Agostinelli |
| 7,137,707 B2 | 11/2006 | Beardsley et al. |
| 7,185,987 B2 | 3/2007 | Tamura |
| 7,215,362 B2 | 5/2007 | Klose |
| 2002/0186221 A1 | 12/2002 | Bell |
| 2004/0102247 A1 | 5/2004 | Smoot et al. |
| 2004/0201823 A1 | 10/2004 | Raskar et al. |
| 2005/0046803 A1* | 3/2005 | Akutsu .................... 353/69 |
| 2005/0117073 A1 | 6/2005 | Payne et al. |
| 2006/0001543 A1 | 1/2006 | Raskar et al. |
| 2006/0028483 A1 | 2/2006 | Kondo et al. |
| 2006/0033702 A1 | 2/2006 | Beardsley et al. |
| 2006/0038959 A1 | 2/2006 | Hull et al. |
| 2006/0072076 A1 | 4/2006 | Smoot et al. |
| 2006/0256298 A1* | 11/2006 | Knipe ...................... 353/69 |
| 2007/0099700 A1 | 5/2007 | Solomon et al. |
| 2007/0282564 A1 | 12/2007 | Sprague et al. |
| 2008/0012824 A1 | 1/2008 | Grunnet-Jepsen et al. |
| 2008/0013053 A1* | 1/2008 | Anson ..................... 353/69 |
| 2009/0079945 A1* | 3/2009 | Klosowiak et al. ......... 353/69 |
| 2009/0207322 A1 | 8/2009 | Mizuuchi et al. |
| 2009/0246749 A1 | 10/2009 | Thursfield et al. |

* cited by examiner

*Primary Examiner*—Seung C Sohn
(74) *Attorney, Agent, or Firm*—Andrus, Sceales, Starke & Sawall, LLP

(57) ABSTRACT

An interactive image projecting device that projects an image onto a display surface and controls the projected image based upon movement of the image projecting device or the detection of another image. The image projecting device includes a projector that generates an image from a control unit. The device includes a position indicating emitter that generates a position indicator and an image sensor that is operable to detect the position indicator from either the device including the image sensor or a position indicator from another device. Based upon the sensed position indicator from another device, the control unit operates to modify the image projected from the device such that the image from a first device can interact with an image from a second device. The first and second devices each have a wireless transceiver such that the devices can communicate with each other during operation.

25 Claims, 24 Drawing Sheets

INTERACTIVE PROJECTOR SYSTEM AND METHOD

FIELD OF THE INVENTION

The present invention generally relates to interactive video entertainment devices. More specifically, the present invention relates to interactive image projecting devices that control the image being projected based upon the orientation and movement of the projecting apparatus and based upon images projected by another image projecting apparatus.

BACKGROUND OF THE INVENTION

Presently, there have been many different types of interactive video entertainment devices that allow a player/user to move a device or controller that results in movement of the game being played. One type of highly popular video game console is the Wii game machine and controller manufactured by Nintendo, Inc. of Japan. This game system enables a user to interact with a video game by waving or swinging a wireless controller through the air. However, this type of game system requires a game machine, display monitor and controller to allow the player to interact with the gaming environment. Other types of hand held electronic entertainment devices are readily available that include very small display screens. These types of devices, although allowing the player to have increased mobility when playing the game, do not allow the participant to interact with the video game either by moving a controller or the device. Instead, the user simply depresses buttons or control elements on the hand held gaming device to control operation of the gaming environment.

Presently, manufacturers and product developers are working on video projectors that are very small in size and can be embedded into other devices, such as video cameras or cell phones. The current focus of these projection systems is to provide a very small projector for use in projecting video images, rather than on utilizing the projectors in a gaming or entertainment device.

Therefore, an opportunity exists for the use of small and compact video projectors in a hand held device for use in playing games and other interactive opportunities. Further, an opportunity exists for the use of small video projectors in combination with image sensors such that a hand held entertainment device can interact with other devices to provide a unique interactive gaming experience.

SUMMARY OF THE INVENTION

The present invention generally relates to an interactive image projecting device in which the device generates an output image. A control unit within the interactive image projecting device modifies the projected image based upon either movement of the projecting device or the detection of an image from another device. In one embodiment, the image projecting device includes a microprocessor-based control unit that is operatively associated with a projector for projecting an image from the device. Preferably, the projector is a laser-based projector, although other types of projectors are contemplated.

In addition to the projector, the image projecting device also includes an image sensor that is operable to detect images, objects and movement in front of the image projecting device. As an example, the image sensor may be a CMOS camera that is able to detect at least infrared light in a region in front of the image projecting device. The image sensor is coupled to the control unit such that the control unit can respond to images sensed by the image sensor.

In addition to the image sensor, the image projecting device preferably includes a position indicating emitter, such as an infrared LED. Preferably, the position indicating emitter emits an infrared beam of light to define a position indicator on a display surface. The position indicator may be of various shapes and patterns, but it is preferred that an anisotropic shape be used such that rotation of the image can be sensed.

The image projecting device can also include a spatial position sensor that is mounted within the housing of the image projecting device and is operable to generate a movement signal received by the control unit that is based upon the movement of the housing. Preferably, the spatial position sensor is an MEMS accelerometer, although other devices are contemplated. Based upon the sensed movement signals from the spatial position sensor, the control unit can modify the image from the device to simulate the movement of the image projecting device.

Preferably, each of the interactive image projecting devices includes a wireless transceiver such that an image projecting device can communicate to other devices. The communication between a pair of image projecting devices allows the devices to interact with each other such that the images displayed by each device can react to the image being displayed by the other device.

In one embodiment of the image projecting device, the device includes an illuminating emitter that can be activated to generate an illuminating light source. Preferably, the illuminating light is a source of infrared light. When the illuminating emitter is activated, the illuminating emitter creates an infrared "shadow" behind objects positioned in front of the image projecting device. Based upon the presence or absence of a shadow, the control unit of the image projecting device can complete desired actions. As an example, the elimination of a shadow behind a player's hand indicates that the player has contacted a display surface. This contact hand gesture can be interpreted by the control unit to cause the control unit to modify its displayed image.

In addition to being used as a stand-alone unit, each of the interactive image projecting devices can be utilized with another device. In such use, the first device generates a first image and a position indicator that are displayed upon a display surface. At the same time, a second device is displaying a second image and a second position indicator. During operation, the image sensor of the first device attempts to locate the position indicator from the second device. When the image sensor detects the position indicator from the second device, the image sensor relays this information to the control unit. Upon sensing another device, the control unit of the first device modifies the image being projected from the first device such that the first image interacts with the second image. At the same time, the second device can sense the position indicator of the first device and adjust its image accordingly. In this manner, a pair of first and second devices can adjust their projected images such that the images appear to interact with each other.

BRIEF DESCRIPTION OF THE DRAWINGS

The drawings illustrate the best mode presently contemplated of carrying out the invention. In the drawings.

DETAILED DESCRIPTION OF THE INVENTION

Figure 1:
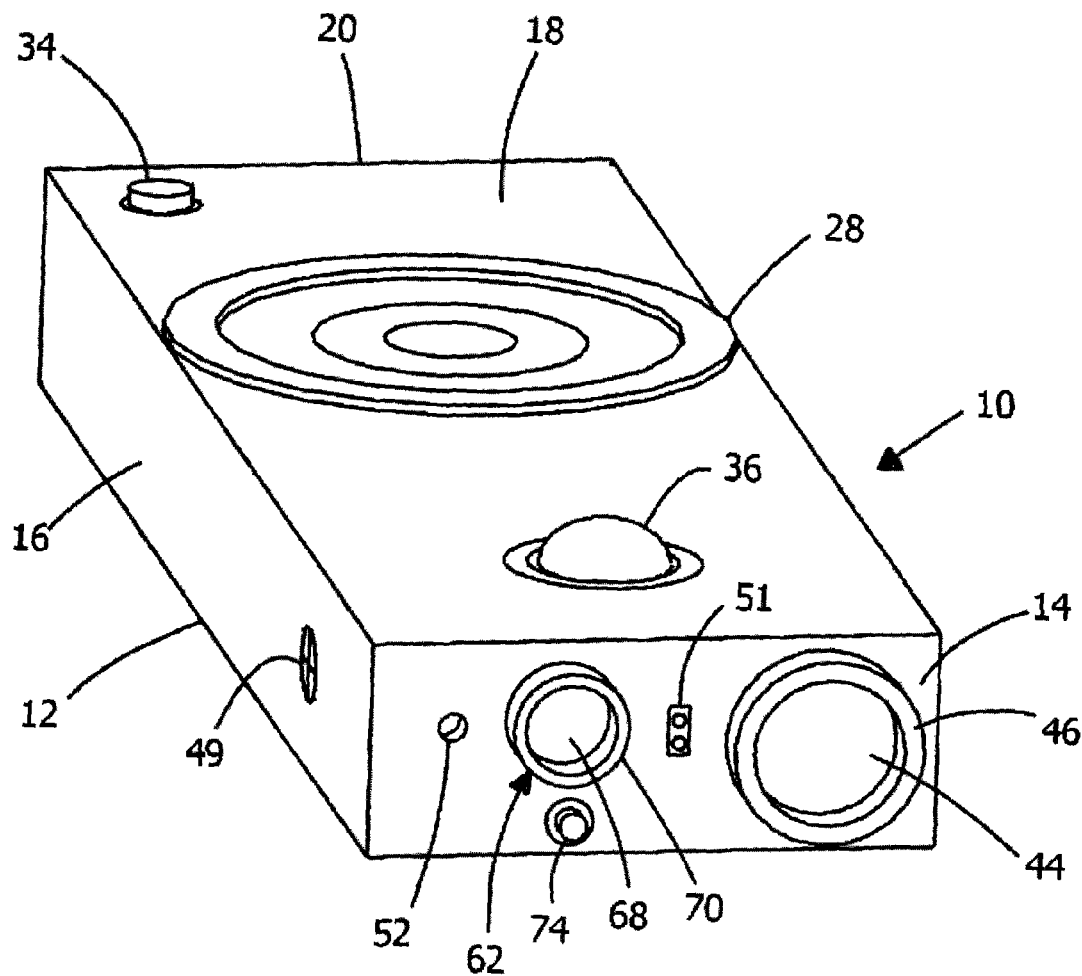
FIG. 1 is a perspective view of a first embodiment of the interactive image projecting device of the present invention.
Figure 2:
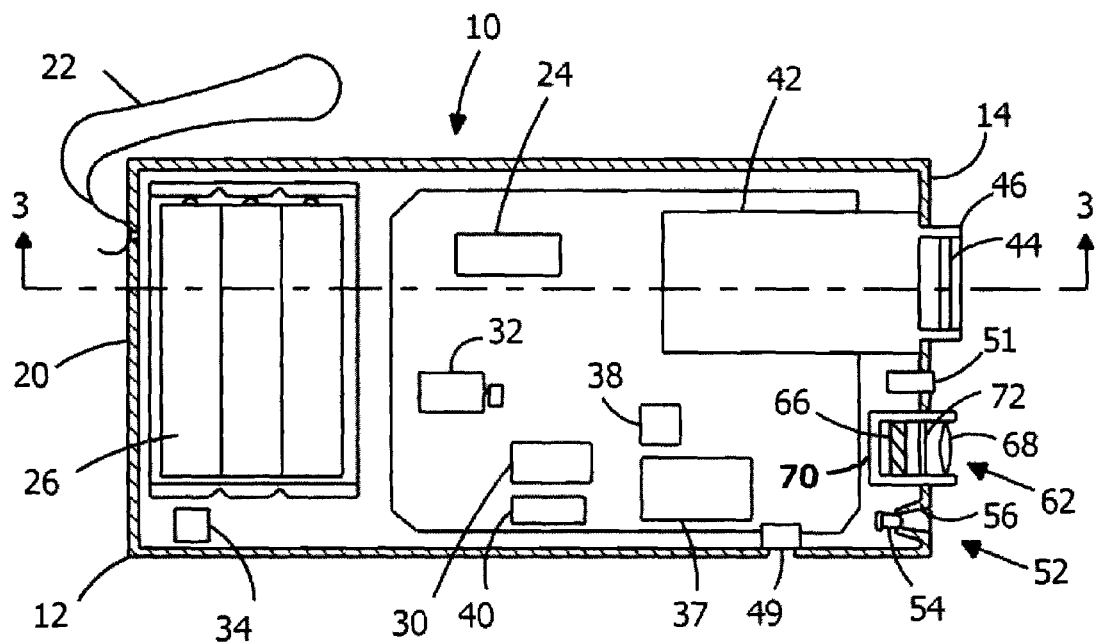
FIG. 2 is a top, internal view of the image projecting device of FIG. 1.
Figure 3:
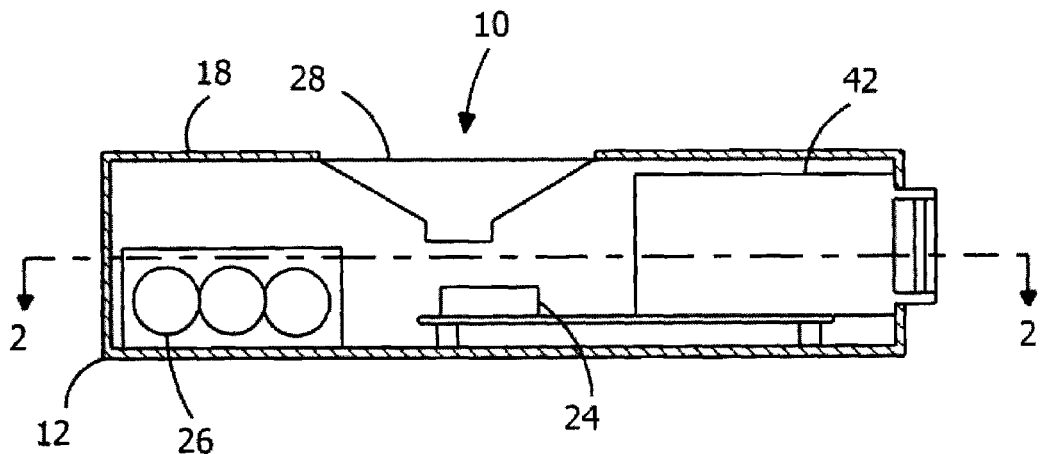
FIG. 3 is a side, internal view of the image projecting device.

Referring first to FIGS. 1-3, thereshown is a first embodiment of an image projecting device 10 constructed in accordance with the present invention. The image projecting device 10 is designed to be of a size that can be held in the hand of a user. In the embodiment shown in FIGS. 1-3, the image projecting device 10 includes an outer housing 12 preferably formed from an injection-molded plastic material, such as polypropylene, polystyrene or polycarbonate. The outer housing 12 in the embodiment shown is roughly 120 mm long by 80 mm wide by 25 mm thick in size, although other sizes are clearly contemplated as being within the scope of the present disclosure.

The outer housing 12 defines a front end 14, a pair of sides 16, a top surface 18 and a back end 20. In the embodiment shown in FIG. 2, the back end 20 includes a plastic, vinyl or cloth strap 22 that allows the user to attach the device 10 to the wrist or clothing so that the device does not accidentally become separated from the user during use of the device.

Referring now to FIG. 2, the image projecting device 10 includes a central control unit 24 that controls the operation of the entire device. In the embodiment shown in FIG. 2, the control unit 24 is a microprocessor that is capable of operating the components to be described in detail below. The control unit 24 includes a self-contained, internal power supply, such as a series of batteries 26 that are self-contained within the outer housing 12. The batteries 26 provide operational power for the remaining components to be described.

Further shown in FIG. 2, a data storage unit 37 is coupled to the control unit 24 enabling the reading and writing of data during operation. The storage unit includes dynamic memory along with a hard drive, disk player, or Flash memory cartridge, although other kinds of data storage are clearly contemplated as being within the scope of the present disclosure.

The image projecting device 10 includes a speaker 28 for playing sounds from a sound synthesizer integrated circuit 30. The sound synthesizer 30 receives signals from the control unit 24 to control the sounds played by the image projecting device 10. In the embodiment illustrated in FIG. 2, the device includes a small, vibrator motor 32 that can be activated by the control unit 24 to cause the entire device 10 to vibrate as desired. In addition, the device 10 contains a microphone 49 that is sensitive to ambient sound, such as a player clapping or a door knock sound. The microphone 49 is operatively coupled to the control unit 24, enabling a player to interact with the image projecting device 10 using sound. An on/off switch 34 is positioned within the outer housing 12 and is accessible from the top surface 18. The on/off switch 34 is shown as being a push-button, although other types of switches are clearly contemplated as being within the scope of the present disclosure.

The top surface 18 further includes a track ball 36 that is in operative communication with the control unit 24. The track ball 36 allows the player to enter movement information into the image projecting device 10 such that the image projecting device can control movement of a display image based upon signals entered by a player through the track ball 36.

Referring now to FIG. 2, the image projecting device 10 includes a spatial position sensor 38 that is operatively connected to the control unit 24. In the preferred embodiment of the invention, the spatial position sensor 38 is a MEMS accelerometer that provides movement signals to the control unit 24. Preferably, the MEMS accelerometer provides information to the control unit regarding movement of the entire image projecting device 10 along x, y and z axes. Through the information received from the spatial position sensor 38, the control unit 24 is able to determine relative movement of the entire image projecting device 10 by the player.

As can also be seen in FIG. 2, the image projecting device 10 includes a wireless transceiver 40 that is operatively coupled to the control unit 24. The wireless transceiver 40 allows for two-way communication between the image projecting device 10 and another similar image projecting device 10. Additionally, the wireless transceiver 40 allows for wireless communication between the image projecting device 10 and other wireless communication devices, such as a personal computer or other device that is able to communicate through wireless transmission. It is contemplated that the wireless transceiver 40 could communicate using various different wireless transmission techniques, such as Bluetooth, RF, ZigBee or any other similar wireless standard.

The image projecting device 10 further includes a projector 42 that is in operative communication with the control unit 24 and is operable to project an image from the image projecting device 10. As illustrated in FIGS. 1 and 2, the projector 42 extends through the front end 14 such that the projector 42 is able to project an image forward of the front end 14. In the embodiment of the invention shown in FIGS. 1-3, the projector 42 is a laser-based projector that projects a visible color image through a transparent cover 44. The transparent cover 44 is retained within a circular housing 46. Unlike standard incandescent bulb projecting systems, the laser-based projector 42 does not require any focusing lens since the projected image is always in focus, irrespective of the projector to wall distance. One desirable property of the laser-based projector 42 of the first embodiment is the ability to clearly display an image on an irregular background of objects, such as a chair near a wall. Since the image from the laser-based projector is always in focus, the image that falls on both the chair and the wall will be in focus. Although a laser-based projector 42 is shown and described in the first embodiment, it should be understood that other types of image projecting systems, such as those that incorporate an incandescent bulb and a focusing lens, are contemplated as being within the scope of the present invention.

Figure 10:
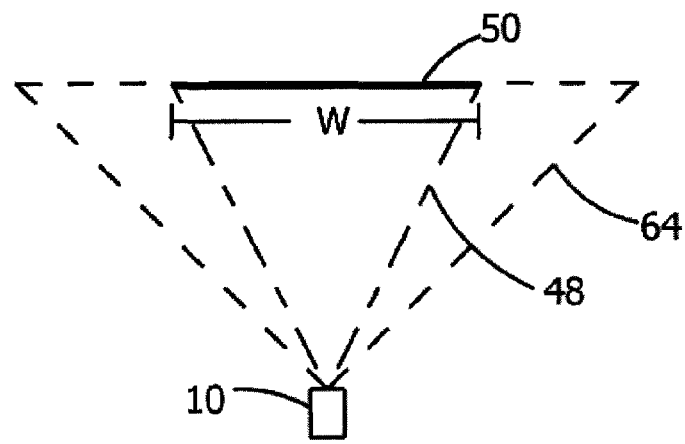
FIG. 10 is a diagram of the display field for the image projector and the viewing field for the image sensor.

In the embodiment shown in FIGS. 1-3, the laser-based projector 42 has a light divergent angle of approximately 20°-60° to define an image projection field, as shown by reference numeral 48 in FIG. 10. The image projection field 48 is shown contacting a display surface 50 such that the image has a width W, which is determined by the divergent angle of the projector and the distance of the image projecting device 10 from the display surface 60.

Referring back to FIG. 2, the image projecting device 10 further includes a position indicating emitter 52 that is operable to generate and project a position indicator from the front end 14 of the image projecting device. In the embodiment shown in FIG. 2, the position indicating emitter includes an infrared light emitter, such as infrared LED 54, that is positioned within a waveguide 56. In the embodiment shown, the waveguide 56 is an anisotropic-shaped focusing waveguide that produces a focused, infrared beam from the infrared LED, typically of 1°-20° of divergence, which projects forward from the device 10 and illuminates an ambient surface. The infrared LED 54 produces infrared light having an approximate wavelength of 880-940 nanometers, which is commonly available in the current marketplace.

In the embodiment shown in FIG. 2, the anisotropic-shaped focusing waveguide 56 is molded into the housing 12 and acts as a tube or guide for light waves from the LED 54. One advantage of such a design approach is that the divergence angle of the light from the LED 54 can be controlled independently of the light divergence angle of the infrared LED 54. Such a design ensures that each of the image projecting devices 10 will produce the same light divergence angle, irrespective of potential slight variations in the light-sensitive hardware component characteristics. In addition, the anisotropic-shaped focusing waveguide 56 produces an anisotropic-shaped area of infrared light on the ambient surface.

Figure 4A:
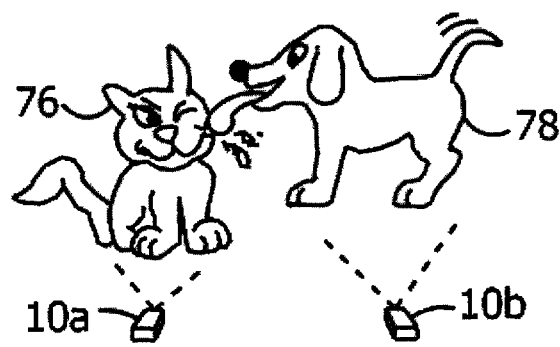
FIG. 4a is an illustration of a first and a second image projected by a first and second image projecting devices.
Figure 4B:
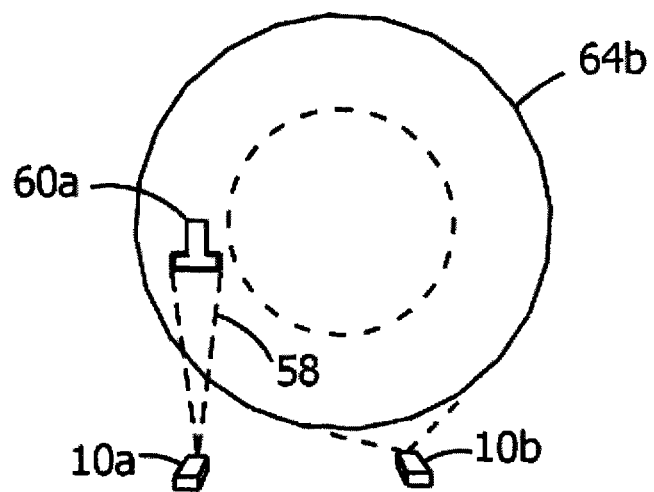
FIG. 4b illustrates the infrared camera view of the second image projecting device and the position indicator from the first image projecting device.

As shown in FIG. 4b, the position indicating emitter emits light at the divergence angle shown by dashed lines 58 to create the position indicator 60. In the embodiment shown in FIG. 4b, the position indicator 60 has a "T" shape, although other anisotropic patterns or anisotropic-shaped position indicators 60 are contemplated as being within the scope of the present disclosure. Further, other types of emitters are also contemplated as being within the scope of the invention, as are other wavelengths of light being emitted. For example, the laser projector 42 could contain an infrared laser emitter, providing a means to produce the position indicator.

Referring back again to FIG. 2, the image projecting device 10 further includes an image sensor 62 that is operatively coupled to the control unit 24. The image sensor 62 is operable to detect images that are projected in front of the image projecting device 10. Preferably, the image sensor 62 has a field of view that is wider than the projection field for the image projecting device 10. Referring now to FIG. 10, the image viewing field 64 for the image sensor is shown as being greater than the image projecting field 48. In this manner, the image projecting device 10 can sense an area greater than the area over which the image projecting device 10 can project an image.

Referring back to FIG. 2, in the preferred embodiment of the invention, the image sensor 62 is a CMOS camera 66 positioned behind an optical lens 68 that is mounted within the front end 14 of the outer housing 12. The optical lens 68 is mounted within a camera housing 70 that can, in the embodiment shown in FIG. 2, include a filter 72 designed to filter out undesirable light. In the embodiment shown in FIG. 2, the filter 72 is an infrared bandpass filter that is transparent to infrared light and opaque to all other types of light, such as visible light. The optical lens 68 is capable of transferring both infrared light and visible light and is preferably made of materials such as polypropylene, polyethylene or glass. Further, other types of image sensors are also contemplated as being within the scope of the invention, such as a CCD sensor, thermal sensor, or photo diode array.

In the embodiment shown in FIG. 2, the CMOS camera 66 is operatively connected to the control unit 24 and contains a complementary metal-oxide semiconductor (CMOS) sensor, typically having a global synchronous electronic shutter, along with an approximate view angle of 40°-120°. Examples of CMOS cameras 66 are available from various manufacturers, such as Texas Instruments, Toshiba, and Fujitsu, although various other types of the CMOS camera are well known in the art.

Referring now to FIG. 1, the image projecting device 10 further includes a wide angle illuminating emitter 74 that is mounted just behind the front end 14 of the outer housing 12. The illuminating emitter 74 is positioned below the image sensor 62 and is operable as an illuminating device for illuminating objects in front of the image projecting device. As an example, the illuminating emitter 74 can be a wide-angle infrared emitter having a divergence light angle of 40°-120° and having an approximate wavelength of 880-940 nanometers. Such an infrared emitter is commonly available in the marketplace. For greater illumination, a plurality of emitters is also contemplated as being within the scope of the invention.

Referring back to FIG. 1, the image projecting device 10 further includes a range locator sensor 51, mounted just behind the front end 14 of the outer housing 12. The range locator sensor 51 is operatively connected to the control unit, providing a means to determine the distance to the ambient surface on which the projected image resides. The range locator sensor 51 is preferably a narrow beam, infrared range locator having a sensitivity range of about 0.5 to 6 feet, such as the Sharp GP2Y0A02YK IR sensor, although other types of range locators are contemplated as being within the scope of the invention. As an example, the combination of the position indicating emitter 52 and the image sensor 62 could be configured to determine the range to the projection surface based upon triangulation or "time-of-flight" of the light path.

Figure 4C:
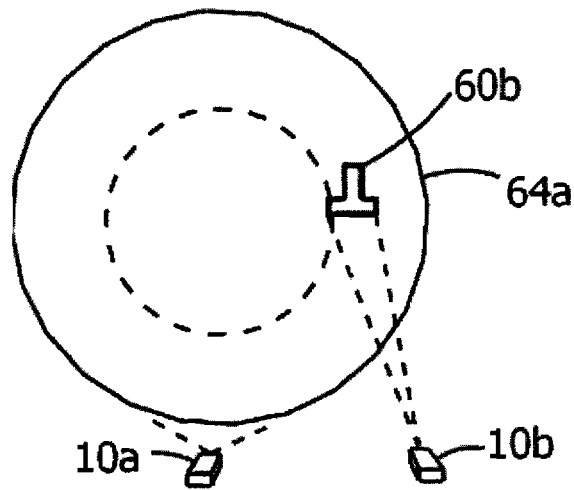
FIG. 4c shows the infrared camera view from the first image projecting device and the position indicator from the second image projecting device.

Referring now to FIGS. 4a-4c, the operation of a first image projecting device 10a and a second image projecting device 10b will be described. As illustrated in FIG. 4a, the first device 10a is projecting a first image 76, such as a cat, while the second device 10b is projecting a second image 78, such as a dog. Although first and second images 76, 78 are shown in FIG. 4a, it should be understood that the devices 10a, 10b could be programmed to display any type of image desired.

As shown in FIG. 4b, the first device 10a also projects a position indicator 60a while the second device 10b has an image viewing field 64b for the image sensor. As shown in FIG. 4b, the image sensor for the second device 10b can detect the position indicator 60a from the first device 10a since the position indicator 60a is within the image viewing field 64b.

At the same time, the image sensor of the first device 10a has an image viewing field 64a that can detect the presence of the position indicator 60b from the second device 10b. In this manner, the first and second image projecting devices 10a, 10b can detect the presence of the other device and determine the position of the position indicator 60 of the other device relative to the image viewing field 64. Based upon the detected location of the image from the first device 10a relative to the second device 10b, the control unit of the respective devices can modify the image produced by the device such that the images 76, 78 appear to interact with each other.

Although the image projecting devices 10 shown in FIGS. 4a-4c are described as being able to interact with each other, each of the image projecting devices 10 could be utilized separately. In a use without another device, the user first depresses the on/off switch 34 to turn the device on. Once the device is on, the user points the device toward a wall or other similar surface roughly 1-6 feet away to observe a projected image of a character on the wall. Preferably, the projected image would typically range in size from 1-6 feet in diameter, depending upon the distance from the device to the display surface.

Since the device 10 includes the x, y, z axis spatial position sensor 38, the device 10 can determine the relative motion of the device in 3D space as the player moves the device in an arc, zigzag, or a straight motion. The control unit 24 reads the output of the spatial position sensor 38 and animates the projected image accordingly. For example, if a player sweeps or moves the device along the wall in a left horizontal direction, the projected image moves in an animated manner to the left. Likewise, if the player sweeps the projected beam of light along the wall in a right horizontal direction, the projected image moves in an animated manner to the right. Further, as one moves the projected beam of light along the wall and onto the ceiling, the projected image turns around and appears to be walking away from the player. Finally, if the player sweeps the image down toward the floor, the projected image turns around and appears to be walking toward the user.

It is anticipated that the control unit 24 can accomplish various movements of the image based upon signals received from the spatial position sensor 38. As an example, if the control unit determines the device is tilted with a quick, upward flick of the wrist, the projected image may be revised to cause the image to perform a certain action, such as having a dog sit up on its hind legs. If the device is tilted downward with a quick, sudden movement of the wrist, the projected image could perform another action, such as causing a dog to lie down.

Additional interaction capabilities are obviously within the scope of the present disclosure and depend upon the type of character being shown in the image and the movement of the image projecting device. Further, since the device 10 includes other input devices, such as the track ball 36 shown in FIG. 2, the control unit can be operated to cause the image to perform certain functions depending upon the movement of the track ball 36 with the player's finger. The track ball 36 can be used to move a portion of the image, such as a cursor or other indicator, along the image. Once the cursor or other indicator is in the desired position, the projecting device 10 can cause the image to perform another action, such as a dog picking up a bone.

Figure 7A:
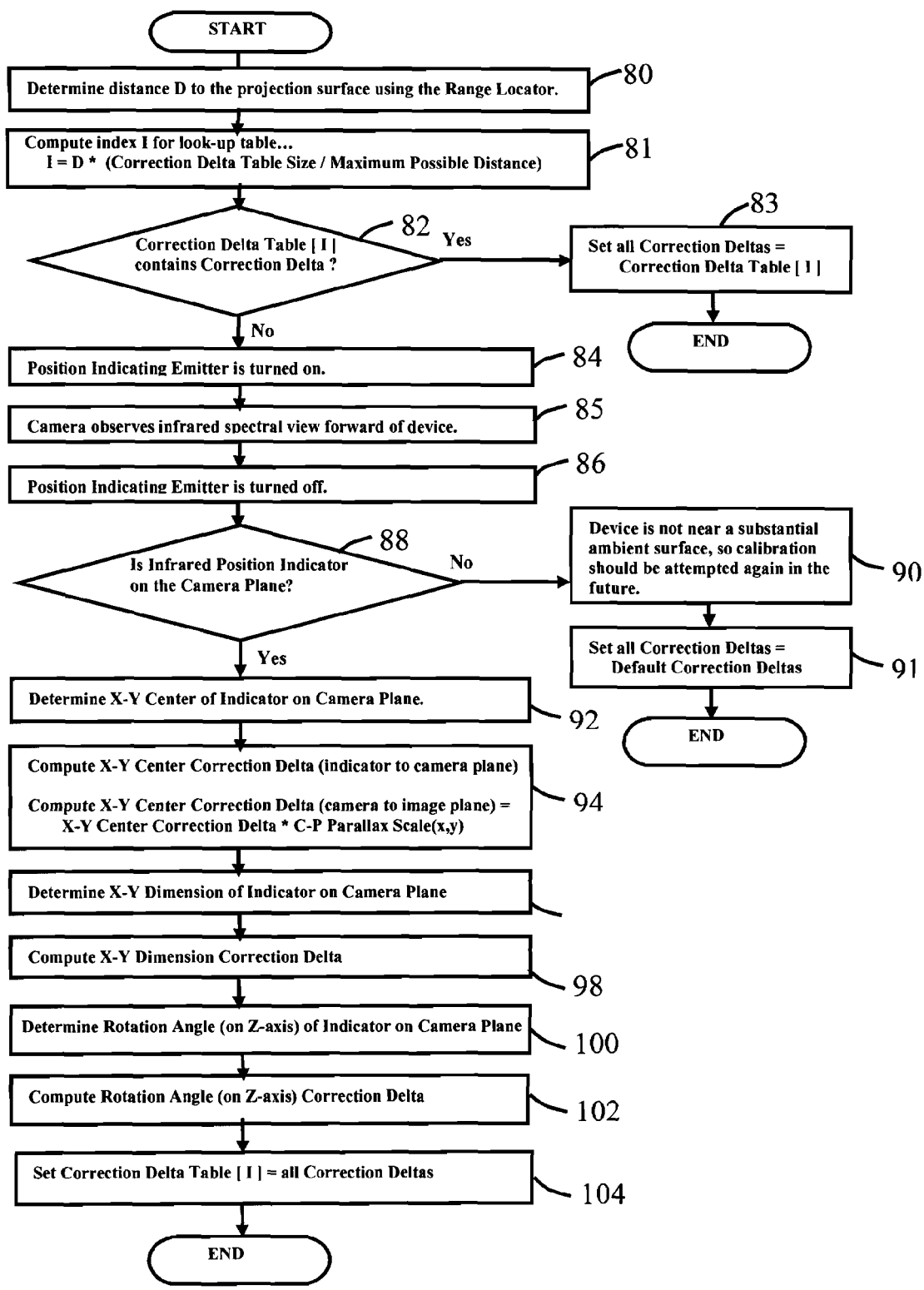
FIG. 7a is a flow diagram of the control unit during the calibration of the image projecting device.

Referring now to FIG. 7a, before the image projecting devices 10 are used to interact with each other, and periodically while the devices are interacting with each other, each of the image projecting devices goes through a self-calibration process shown by the flowchart of FIG. 7a. As illustrated in FIG. 7a, the control unit for the image projecting device first determines the distance to the projection surface using the range locator, as shown in step 80. Subsequently, the control unit then computes look-up table index I in step 81. If item I within the look-up table already contains data, as shown in step 82, all correction Δ values are set in step 83. If the device (at this projection distance) has not been calibrated, the control unit turns on the position indicating emitter to generate the position indicator, as described in step 84. Once the position indicator is being generated, the control unit operates the image sensor to observe the infrared spectral field forward of the image projecting device in step 85. After the image sensor has been turned on, the position indicator is turned off in step 86 and the control unit determines whether the infrared position indicator is present on the image viewing field of the image sensor in step 88.

If the infrared position indicator is not within the image viewing field, the control unit determines in step 90 that the device is not near an ambient surface and calibration needs to be attempted in the future. Upon such determination, all correction Δ values are set to default values in step 91. However, if the infrared position indicator is viewable in the image field, the control unit determines the x and y center of the position indicator in the camera plane, as indicated in step 92.

Once the x and y locations of the position indicator are determined, the control unit calculates an x-y indicator to camera correction Δ and an x-y camera to projector correction Δ in step 94, having $$C\text{-}P \text{ Parallax Scale}(x, y) = \frac{\text{Projector center}(x, y) - \text{Camera center}(x, y)}{\text{Camera center}(x, y) - \text{Emitter center}(x, y)}$$

using pre-determined x-y measurements made along the front end 14 of the device, where the Projector center(x,y) is the projector center axis position, Camera center(x,y) is the camera center axis position, and the Emitter center(x,y) is the position indicating emitter center axis position. In addition to the position of the position indicator in the camera field, the control unit also determines in step 96 the size of the position indicator on the camera plane and computes the dimension correction Δ in step 98. This process allows the control unit to calibrate for both the position and size of the position indicator.

Finally, in step 100 the control unit determines the axis of rotation of the position indicator. As described previously, the position indicator is preferably an anisotropic-shaped image, which allows the control unit to determine the rotation of the position indicator. The rotational angle is computed and is stored as another correction Δ, as indicated in step 102. The calibration steps shown in FIG. 7a allow the control unit to determine spatial correction Δ quantities that are used to adjust the results of the spatial analysis conducted by the device.

As described previously, FIG. 4a shows a first image 76 (virtual cat) projected by device 10a, and a second image 78 (virtual dog) being projected by a second device 10b. As one can see, the virtual dog is interacting with the virtual cat in a playful manner. Device 10a and device 10b achieve this feat by transmitting spatial and character attribute information as wireless messages back and forth to each other, while concurrently projecting the visible cat and dog respectively.

FIG. 4b shows device 10a shining the position indicating emitter at the wall for a brief period, typically under 0.10 seconds. Preferably, the infrared beam from the emitter would be modulated, typically in the range of 1 kHz to 40 kHz, so as to provide a distinct signal or fingerprint of the light allowing a reduction of ambient noise interference. At the same time, the second device 10b image sensor and control unit filters out all infrared light that is not being modulated using signal analysis techniques. Many image sensors today can achieve such high frames rates using Region of Interest read-outs. As a result, the modulated infrared light reflected from a wall would be distinguished from the surrounding ambient infrared light, such as heat from a window, incandescent lights or a wall heat radiator. In addition, the wireless transceiver from device 10a transmits a message essentially reading:

Device_Id=device 10a unique identifier
Device_Position_Indicator=ON
Object_Id=Fuzzy
Object_Type=cat
Object_Orientation=sitting and facing forward
Image_Displacement=0, −2
Image_Dimension=10, 20
Image_Rotation_Angle=0

The infrared beam from device 10a is received by device 10b. That is, device 10b contains the CMOS camera that has an infrared camera view 64b of the wall on which the reflected infrared position indicator 60a appears. The result is a hotspot or pixel region that is lit up on CMOS camera. Hence, the position of the device 10a projected cat relative to device 10b projected dog may be determined. Device 10b has its control unit read the pixels of its CMOS camera and sees there is a brightly-lit pixel region, defined by high value pixels (where pixel binary values are in proportion to brightness) on the CMOS. Subsequently, the device 10b has its microprocessor-based control unit determine the cat's x-y coordinates by:

cat_relative_*x*=device 10a_infrared_*x*–device 10b_camera_center_*x* cat_relative_*y*=device 10a_infrared_*y*–device 10b_camera_center_*y* where cat_relative_x is the cat's x-coordinate relative to the dog's x-coordinate cat_relative_y is the cat's y-coordinate relative to the dog's y-coordinate device 10a_infrared_x is device 10a infrared position indicator x-coordinate device 10a_infrared_y is device 10a infrared position indicator y-coordinate device 10b_camera_center is device 10b camera center x-coordinate (origin device 10b_camera_center is device 10b camera center y-coordinate (origin)

In addition, the control unit is able to read the device 10a wireless message (defined above) by using its wireless transceiver. In the example above, the control unit is able to interpret the message indicating a cat is nearby.

Besides the determination of a relative x-y center coordinate, the relative size of the projected image from device 10a can be determined from the size of device 10a's infrared position indicator. Of note, the size of the observed infrared position indicator is directly proportional to the size of the projected image. Whereby, if the size of the detected infrared position indicator from device 10a is 10% larger than the size of infrared position indicator from device 10b, then device 10a projected image is 10% larger than the device 10b projected image.

In addition, the relative angle of rotation along the z-axis may be determined. Since each device projects an anisotropic shaped infrared position indicator, the device can compute the relative rotation angle about the z-axis.

FIG. 4c shows device 10b shining an infrared beam at the wall for a brief period, typically under 0.10 seconds. In addition, the wireless transceiver from device 10b transmits a message essentially reading:

Device_Id=device 10b unique identifier
Device_Position_Indicator=ON
Object_Id=Rover
Object_Type=dog
Object_Orientation=standing and facing left
Object_Activity_Device_Id=device 10a unique identifier
Object_Activity=licking
Image_Displacement=0, 0
Image_Dimensions=30, 20
Image_Rotation Angle=0

The infrared beam from device 10b is received by device 10a. The device 10a CMOS camera, which has an infrared camera view 64a of the wall on which the reflected infrared position indicator 60b appears. The result is a hotspot or pixel region that is lit up on CMOS camera. Hence, the position of the device 10a projected dog, which is the center of the infrared position indicator 60b, relative to device 10a projected cat may be determined. Device 10a has its microprocessor-based control unit read the pixels of its CMOS camera and sees there is a brightly-lit pixel region, defined by high value pixels (where pixel binary values are in proportion to brightness) on the CMOS. Subsequently, the device 10a has its control unit determine the dog's x-y coordinates by:

dog_relative_x=device 10b_infrared_x–device 10a_camera_center_x dog_relative_y=device 10b_infrared_y–device 10a_camera_center_y where dog_relative_x is the dog's x-coordinate relative to the cat's x-coordinate
   dog_relative_y is the dog's y-coordinate relative to the cat's y-coordinate
   device 10b_infrared_x is device 10b infrared position indicator x-coordinate
   device 10b_infrared_y is device 10b infrared position indicator y-coordinate
   device 10a_camera_center_x is device 10a camera center x-coordinate (origin)
   device 10a_camera_center_y is device 10a camera center y-coordinate (origin)

In addition, the control unit of device 10a is able to read device 10b wireless message (defined above) by using its wireless transceiver. In the example above, the control unit is able to interpret the message indicating the dog is licking the cat.

The software on device 10a determines that whenever a dog is nearby, the cat will attempt to interact. Once the device 10a determines a dog is nearby, the control unit sends video content to its projector showing the cat squeamishly squinting its eye as the dog licks its face.

Ten seconds later, device 10a may have its control unit send video content to its image projector to show the cat pouncing on the dog. In addition, control unit will send a message via its wireless transceiver that the cat is pouncing on the dog, and sends a command to sound synthesizer to playback a loud cat meow. Device 10b then reads the wireless message and sends video content to its projector showing the dog crouching down and hiding its face. The sound synthesizer may then be activated by the control unit to playback a whimpering dog sound.

Understandably, the exchange of communication between the devices, and subsequent graphic and sound responses can go on indefinitely, or at least until one of the device's batteries or rechargeable power supply is depleted.

To prevent the infrared light probing technique described above from causing confusion when multiple devices are actively projecting their respective images onto the same wall, there are various techniques to ensure effective communication, such as but not limited to:

1) All of the devices strobe their vicinity with infrared light in a round robin fashion. That is, when one device is illuminating its vicinity with infrared light, all other devices are only observing the light and are not emitting infrared light.
2) Each device modulates the infrared light at a different rate (i.e. 1 kHz, 3 kHz, etc.). Whereby, the infrared light from each device is differentiable.

Additional play value may be created with more character attributes, which may also be communicated to other characters. For example, a character attribute may be "strength," a magnitude related to the health of the dog, where the greater the strength value, the healthier the character. Play interaction may affect a character's strength magnitude. As in the preceding message communications, if the dog is pounced on by the cat, the dog's strength may be reduced. Whereby, the owner of the dog (the person holding the device) should take the dog to its water dish to have a drink of fresh water, which increases the dog's strength magnitude. Understandably, a substantial number of character attributes and behaviors may be defined in the software for greater entertainment value.

Figure 7B:
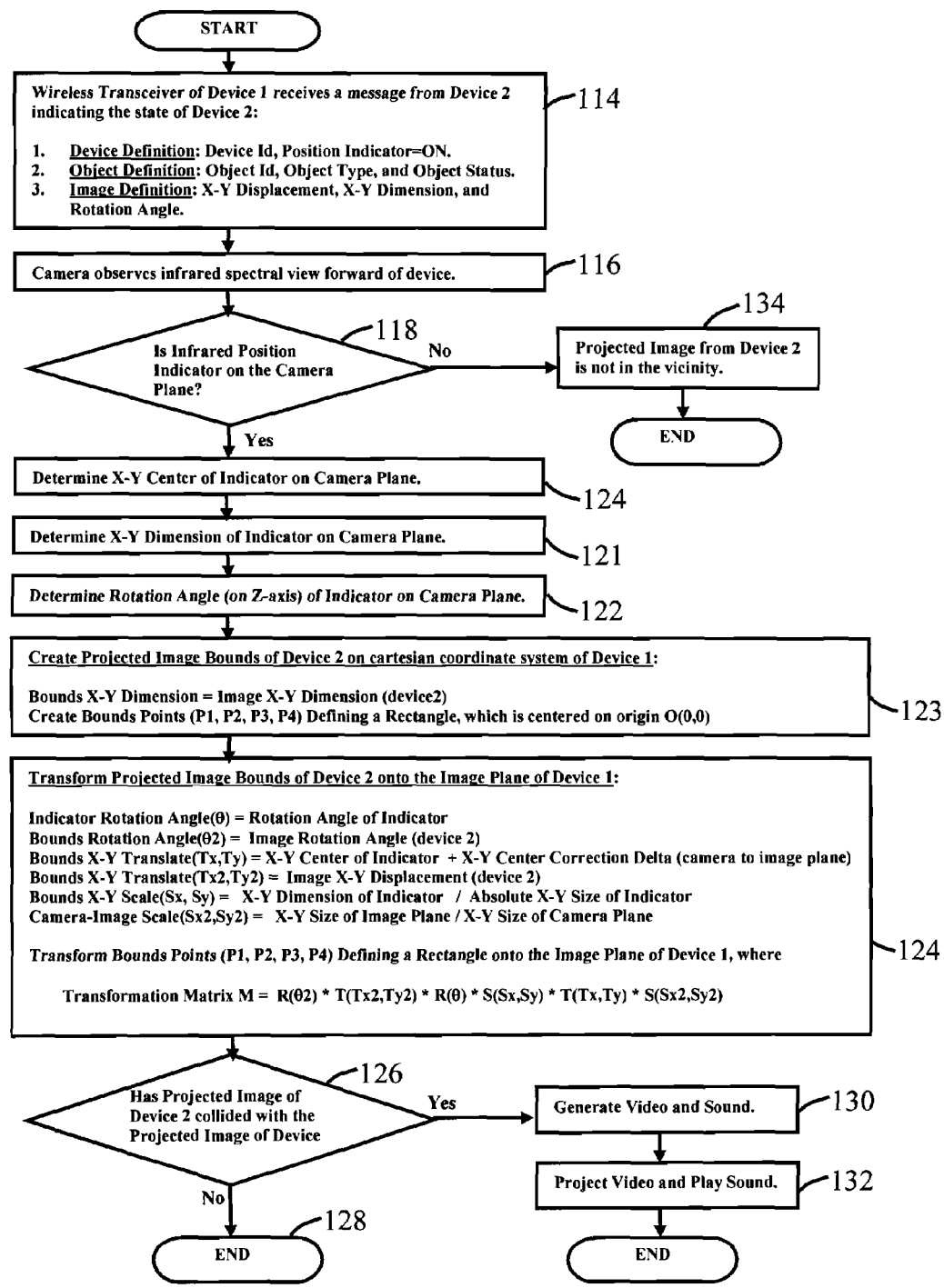
FIG. 7b is a flow diagram of the control unit when operating to detect another device' projected image.

In the first embodiment of the invention shown in FIGS. 4a-4c, the image projecting device interacts with another device such that the image from a first device interacts and responds to either the image or the movement of an image from the other device. FIG. 7b is a simplified flowchart showing the interaction that occurs during use of a pair of the image projecting devices 10.

Initially, the wireless transceiver of the first device receives a message from the second device that indicates that the position indicating emitter of the second device is turned on, the image displacement from the second device, the image dimensions from the second device and the image rotation angle from the second device, as shown in step 114. The image description received by the first device has already been correction Δ adjusted by the second device. Thus, the image description is relative to the position indicator and exactly maps to the projected image of the second device. Once the first device receives this information, the first device turns on its image sensor, which may be a CMOS camera, and observes the infrared spectral view in front of the first device, as shown in step 116. If the device senses the infrared position indicator from a second device in step 118, the first device determines the x and y center of the position indicator on the sensor plane in step 120. In steps 121 and 122, the first device determines the x and y dimensions and angle of rotation of the position indicator on the sensor plane.

Based upon the determined parameters, the first device creates a rectangle composed of four points, centered on the Cartesian origin O(0,0), shown in step 123. The rectangle corresponds to the projected image shape of the second device. Subsequently, the first device transforms the projected image shape points onto its own image plane in step 124. The coordinate transformation M is completed using standard 2D coordinate transformation, where the homogenized coordinate 3×3 matrices are defined:

$$T(t_x, t_y) = \begin{bmatrix} x' \\ y' \\ 1 \end{bmatrix} = \begin{bmatrix} 1 & 0 & t_x \\ 0 & 1 & t_y \\ 0 & 0 & 1 \end{bmatrix} \cdot \begin{bmatrix} x \\ y \\ 1 \end{bmatrix} \text{ Translation}$$

$$R(\theta) = \begin{bmatrix} x' \\ y' \\ 1 \end{bmatrix} = \begin{bmatrix} \cos(\theta) & -\sin(\theta) & 0 \\ \sin(\theta) & \cos(\theta) & 0 \\ 0 & 0 & 1 \end{bmatrix} \cdot \begin{bmatrix} x \\ y \\ 1 \end{bmatrix} \text{ Rotation about origin } O(0,0)$$

$$S(s_x, s_y) = \begin{bmatrix} x' \\ y' \\ 1 \end{bmatrix} = \begin{bmatrix} s_x & 0 & 0 \\ 0 & s_y & 0 \\ 0 & 0 & 1 \end{bmatrix} \cdot \begin{bmatrix} x \\ y \\ 1 \end{bmatrix} \text{ Scaling}$$

A rectangle of four points results, describing the boundary or outline of the projected image from the second device contained on the image plane of the first device, although clearly other methods are contemplated as being within the scope of the invention.

Once these values have been determined, the first device determines in step 126 whether the projected image from the second device has collided with the image from the first device, using a standard collision detection algorithm known in the art. In the embodiment described in the present application, if the two images have not collided, the process ends in step 128. However, if the two images collide, the first device generates video and sound in step 130 and projects a selected video that corresponds to the collision of the two images. The same process described above for the first device is also carried out with respect to the second device during the interaction of the pair of images.

If the system determines in step 118 that there is not a position indicator within the sensor plane, device 1 determines that the projected image from device 2 is not in the vicinity, as shown in step 134.

Figure 5A:
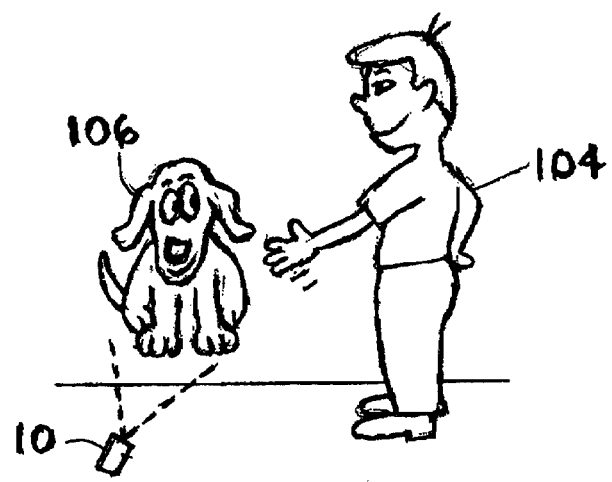
FIG. 5a illustrates the interaction between a projected image and a real world person.
Figure 5B:
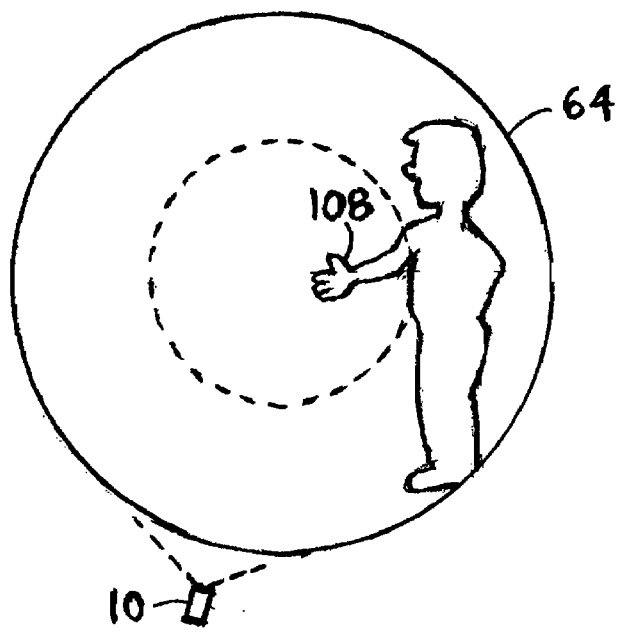
FIG. 5b shows the infrared camera view of the image projecting device and the proximity detection of a human figure.
Figure 5C:
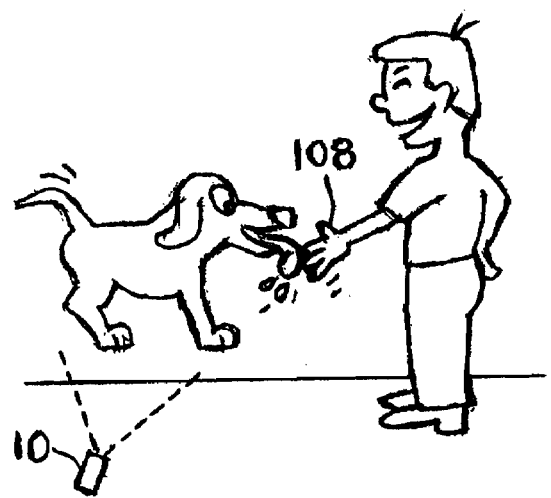
FIG. 5c shows the modified image based upon the detection of the human figure.

Further interaction capabilities can be appreciated in knowing that the device's projected image can interact with real world objects. In FIG. 5a, a real-world person 104 is reaching out to the projected virtual image 106 of a dog from device 10. As shown in FIG. 5b, device 10 can observe the person's hand 108 using the CMOS camera infrared image viewing field 64. In such an application, the control unit of the device 10 computes the person's hand relative x-y coordinate and responds by sending video content to the projector. As a result, the virtual dog turns around, wags its tail, and licks the real-world person's hand, as seen in FIG. 5c.

Figure 16:
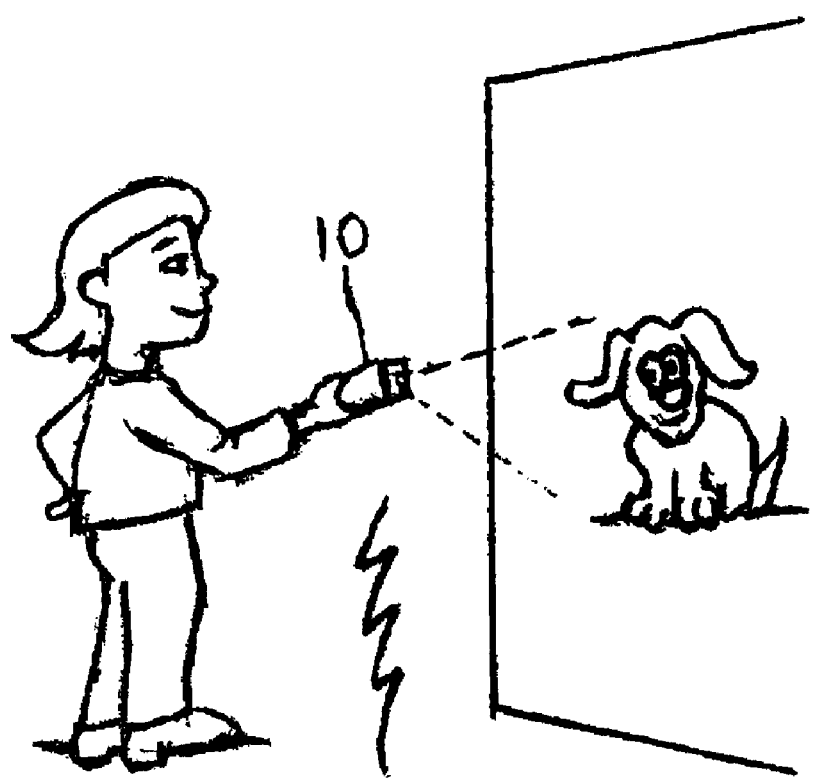
FIG. 16 illustrates the image projecting device wirelessly communicating with an external device, such as a game machine connected to the internet.
Figure 16:
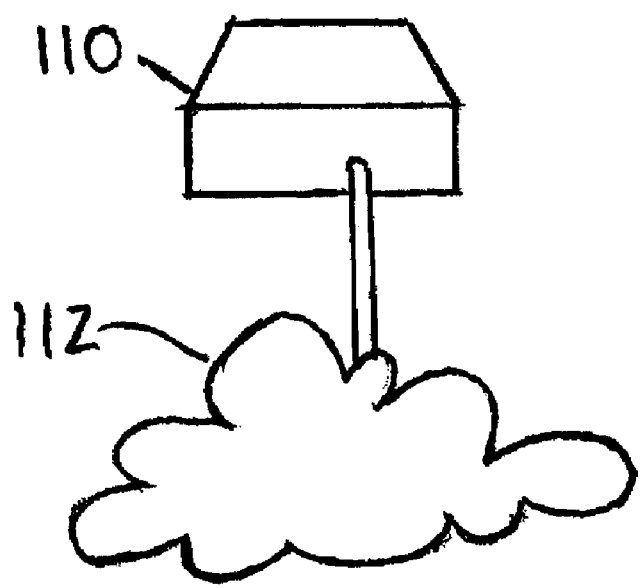

Further interaction capabilities can be appreciated in knowing that the device 10 can optionally communicate with an external device 110, which is connected to the internet network 112, shown in FIG. 16. In such an example, the control unit of the device is able to send and retrieve data from its wireless transceiver, which transmits and receives data from the external device 90.

As pointed out earlier, the image projecting device is a standalone device, requiring no external hardware resources. However, one can take advantage of additional hardware and data resources provided by an external device 110. Such benefits may include access to: 1) greater data storage; 2) faster and more capable data processing capability; 3) more varied digital image, video, and sound content; 4) local intranet and worldwide internet data storage and processing resources; and 5) an additional graphic display, perhaps having greater display area and resolution.

Further, if the external device 110 is a video game machine connected to a large video display, the projected image from the device 10 can be pointed at the external device's video display. Subsequently, the device's projected image could interact with the video display's image. For example, if the device's projected image was a dog, and the video display subject matter was a garden of flowers, a player may sweep the hand-held projector device in a horizontal motion, and see an animated dog go rollicking through the garden of flowers.

Understandably, the projected image's subject matter, animation and play experience may vary in myriad ways. The device is capable of projecting an image of characters, objects, props, background scenery or anything that may be visually represented. As an example, images of a dog, cat, goldfish, race cars, spaceships, dolls, and ninja fighters should all be considered among the possibilities. In addition, a character, such as a dog, may appear with other animated characters, such as a fluttering butterfly, or props such as fire hydrant. Finally, the device may project helpful graphic tools such as cursors, dialog balloons, popup panels, and icons to facilitate complex play interactivity.

Further interaction capabilities can be appreciated in knowing that the device can display a collection of icons and menus, enabling quick and easy navigation of play selections. For example, dialog panels may appear superimposed on projected image, further facilitating one in selection of various options at each step of play interaction.

Further interaction capabilities can be appreciated in knowing that the projected image can zoom in and out as a player moves the device towards or away from the wall. For example, consider a player holding the device 10 and standing in front of a wall, and the projected subject matter is a realistically rendered, full-size virtual door. If the player walks towards the wall, the projected image of the virtual door will unfortunately shrink in size and destroy the visual realism. To avoid this, the device updates the projected image periodically (e.g., every 1/30 second) with the appropriate image zoom relative to the projection distance. Thus, as the player walks towards the virtual door, the visual scale of the door remains constant, giving the impression that the player is moving towards a full-size door. To carry out this function, control unit 24 reads the range locator 51, determines the distance to the wall, and computes the necessary logical image zoom required to maintain the scale of the projected image.

Figure 8A:
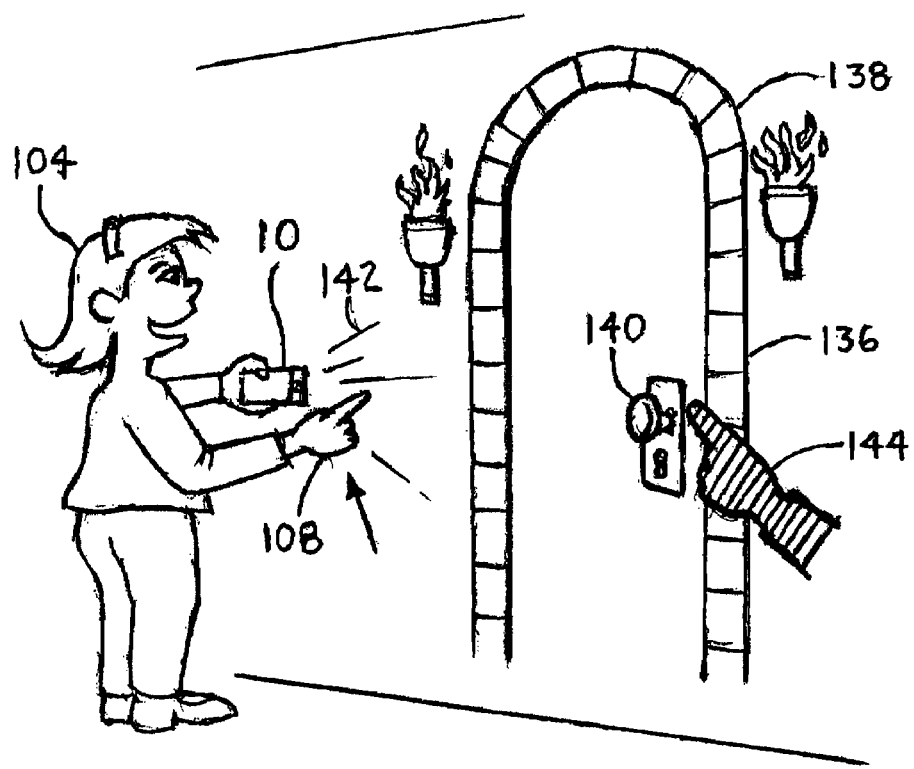
FIG. 8a shows a user making a non-contact hand gesture to interact with the projected image from the image projecting device.

In addition to the embodiment described that allows two images from two image projecting devices to interact with each other, it is also contemplated that the image projecting device could be utilized alone and used to project an image 136 that creates an environment around the user 104, as shown in FIG. 8a. In the example shown in FIG. 8a, the image 136 includes a castle door 138 having a doorknob 140. FIG. 8a illustrates the person 104 interacting with the image 136 by making a non-contact hand gesture within the light beam 142 of the projector, causing a shadow cursor 144 to appear.

In the example shown in FIG. 8a, if the player 104 wishes to open the door 138, the user 104 would place a hand 108 in front of the projector to interrupt the projector's beam of light and create a shadow. This shadow acts as a visual cursor 144 so that the user can position their finger in the approximate spot in front of the projection device. Since the image sensor of the device 10 senses the infrared spectral view in front of the device 10, the image sensor can determine that a finger is being moved at a specific location, as shown in FIG. 8c. The control unit turns on the infrared illuminating emitter 74, which improves the visual contrast between the finger and the wall. The control unit then reads a sequence of captured image frames from the image sensor, perhaps ten image frames at about 1/4 second intervals. Whereupon, the control unit compares the individual image frames and converts the moving "lit up" region of pixels into an x-y coordinate on the projected image shown in FIG. 8*b*. Based upon the location of the user's finger, the software of the control unit converts the x-y coordinates of the players hand into action. For example, if the control unit determines that the x-y coordinate of the player's hand corresponds to the doorknob of the door, the control unit sends video content to the projector causing the virtual door to open, as illustrated in FIG. 8*d*.

In addition to the embodiment shown in FIG. 8*a*, various other types of hand gestures and images are contemplated as being within the scope of the present disclosure. In the environment shown in FIG. 11, the control unit generates a virtual saber 146 that can be moved by the player 104 by moving the player's hand 108 in a chopping motion 148. The result is an animated image of the virtual saber 146 being thrust toward an advancing virtual dragon 136.

As described previously with reference to FIG. 10, the image projection field 48 has a projection angle that is substantially less than the image viewing field 64. In this manner, the image sensor is able to detect movement of a player over a wider field of view than the projected image 48. As seen in FIG. 8*c*, the image viewing field 64 is substantially greater than the image projection field 48 such that the player's hand 108 can be detected well before the player's hand reaches the image projection field 48. In the preferred embodiment, the optimum CMOS camera viewing range should be at least twice that of the projected light cone. Typically, the projected light cone 48 would have an angle of about 20°-60° and the CMOS camera view would have an angle of about 90°-120°.

Figure 8B:
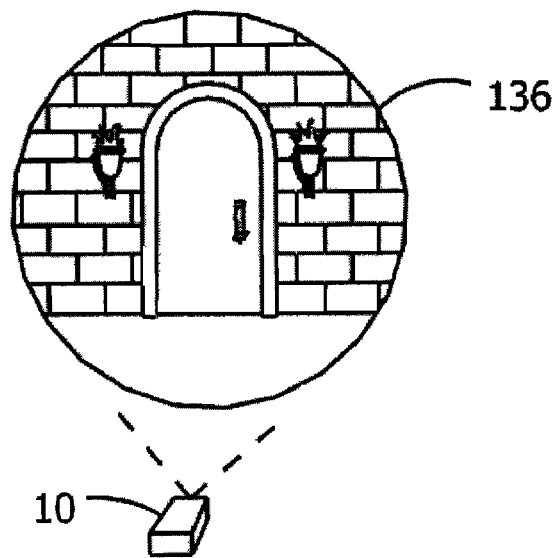
FIG. 8b illustrates a projected image from one of the image projecting devices.
Figure 8C:
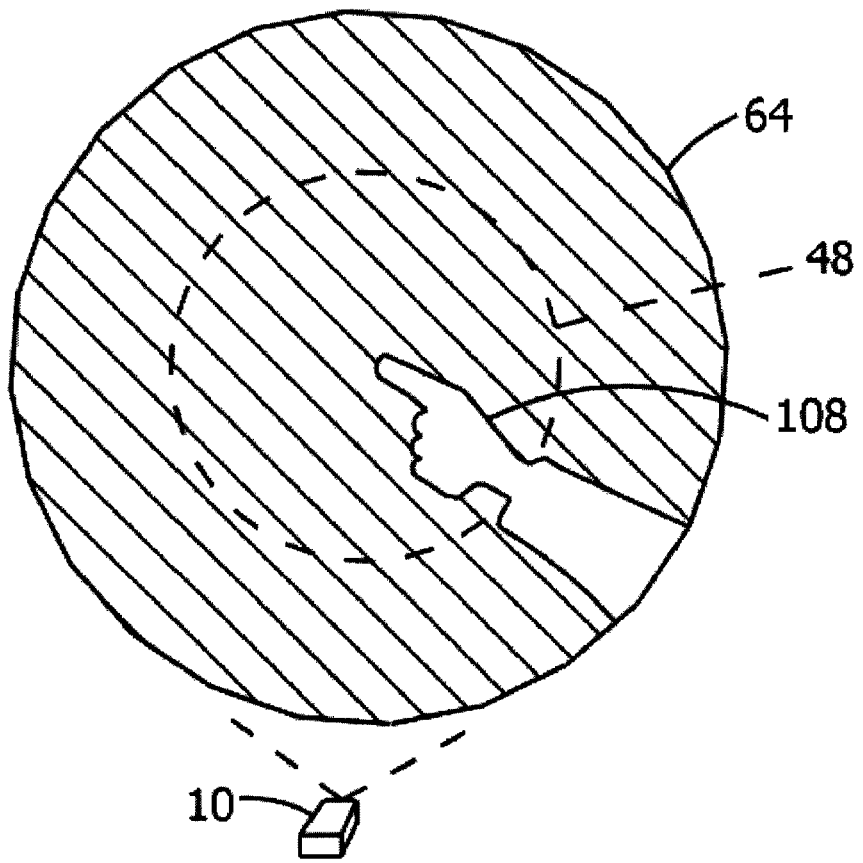
FIG. 8c illustrates the view of the image sensor showing a user that has made a hand gesture.
Figure 8D:
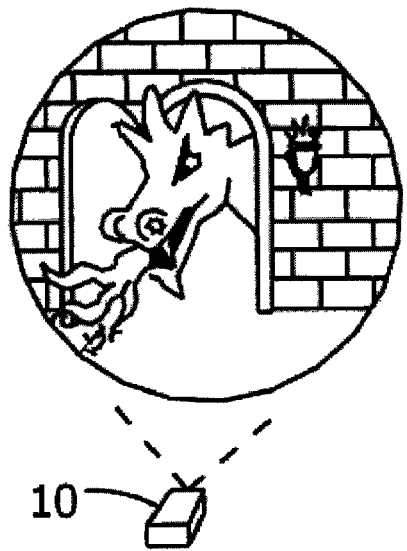
FIG. 8d shows the resulting projected image following the user hand gesture.

In addition to the non-contact hand gestures contemplated in FIGS. 8*b*-8*d*, it is contemplated that the image projecting device could also be utilized to detect when a person contacts the wall or surface that the image is being projected onto. The preferred approach of carrying out such function is to use a source of infrared light emitted by the device, such as the illuminating emitter 74 shown in FIG. 1, to produce a strong shadow effect. Based upon the shadow effect, the image sensor of the device can determine when the player contacts the image viewing surface and, upon detecting contact, carry out the required process.

Figure 6A:
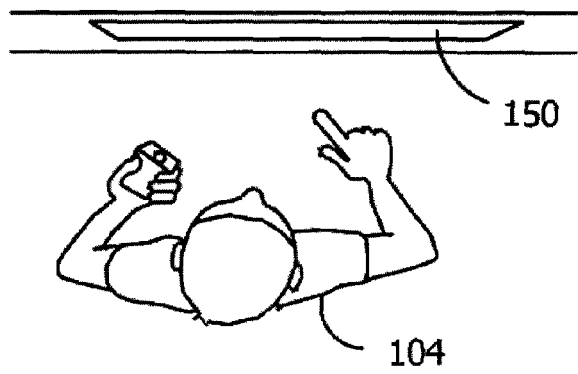
FIG. 6a shows the top view in which a user is about to make a contact hand gesture to interact with the image from the image projecting device.
Figure 6B:
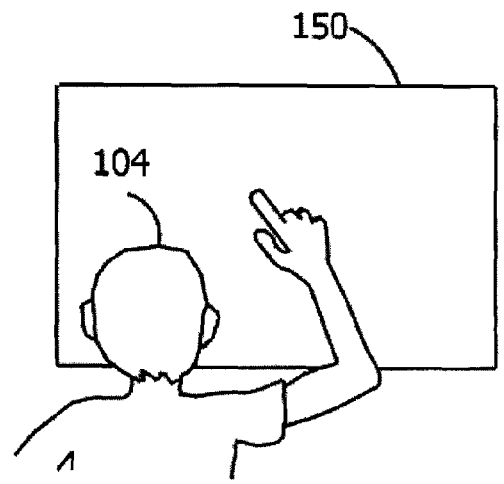
FIG. 6b shows a rear view of the user about to make a contact hand gesture.
Figure 6C:
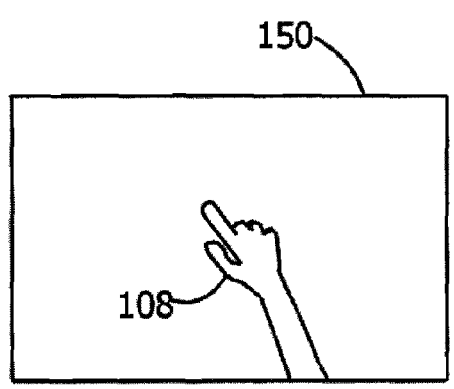
FIG. 6c shows the image sensor view of a user about to make a contact hand gesture.

FIGS. 6*a* and 6*b* illustrate a person 104 standing in front of a viewing screen 150 onto which an image may be projected. The screen 150 could be a wall, movie screen or any other type of surface onto which an image can be projected. FIG. 6*c* illustrates what the image sensor, such as the infrared CMOS camera, observes in the infrared spectrum as a user is about to make a contact hand gesture. As shown, the human hand can be detected using a standard CMOS camera, which is sensitive to infrared light up to 1 micron wavelength. For purposes of teaching, if the sensor had sensitivity to infrared light beyond 1 micron, the image contrast would increase. That is, since the human hand 108 is warmer than its surroundings, the hand 108 would appear "lit-up" and glowing against a dark background. Although the image in FIG. 6*c* indicates that the CMOS camera is able to detect the presence of a human hand, the image of FIG. 6*c* alone cannot determine whether the hand is actually in contact with the screen 150.

Figure 6D:
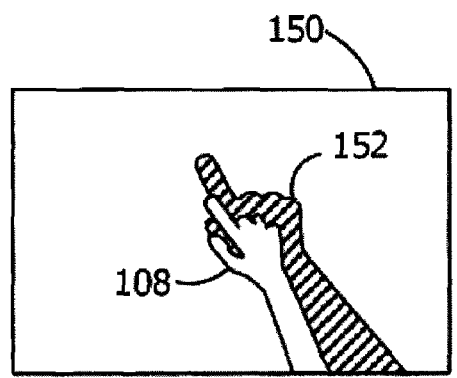
FIG. 6d shows the image sensor view when the illuminating emitter is activated to create a shadow.
Figure 6E:
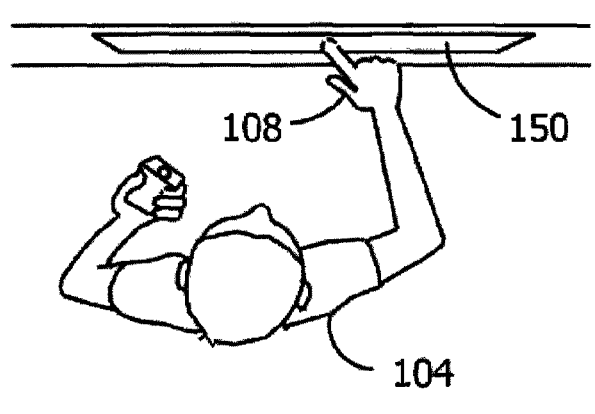
FIG. 6e illustrates a user making contact with a display using a hand gesture.
Figure 6F:
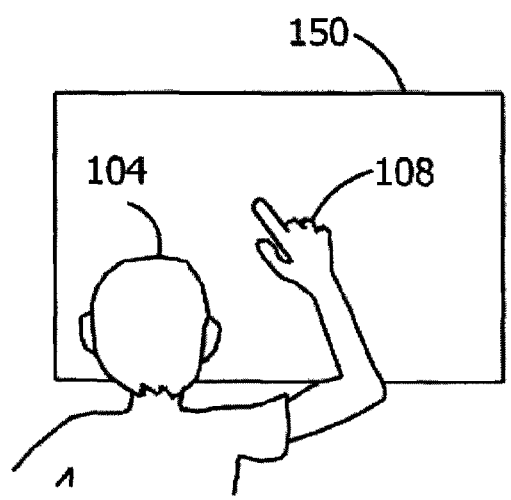
FIG. 6f is a rear view of the user making contact with a hand gesture.
Figure 6G:
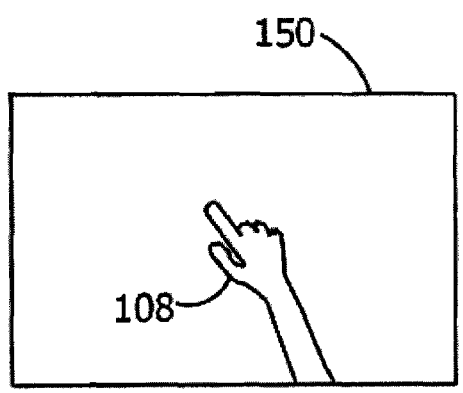
FIG. 6g is the image sensor view when the user has made a contact hand gesture.
Figure 6H:
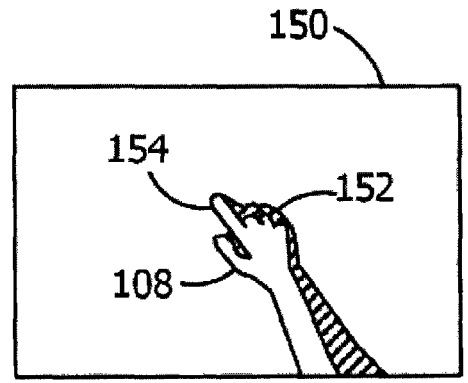
FIG. 6h is the image sensor view when the illuminating emitter is activated.

To detect the contact between the player's hand 108 and the screen 150, the control unit of the image projecting device 10 can turn on the illuminating emitter 74 (FIG. 1) to cause the player's hand 108 to cast an infrared shadow 152, as shown in FIG. 6*d*. Since the shadow 152 is created by the infrared illuminating emitter 74, the shadow is not visible to the user.

FIGS. 6*e*-6*h* illustrate the movement of the player's hand 108 into contact with the display screen 150. As can best be illustrated in FIG. 6*h*, as the player moves his hand 108 into contact with the screen 150, the shadow 152 trails off to a sharp point at the end of the finger 154. When the image sensor, such as the CMOS camera, detects the whole occlusion of the shadow by the player's hand or finger tips, the control unit determines that the player has touched the display screen 150 and responds accordingly. As an example, the player 104 may be depressing a button, area or any other section of the image displayed by the device as is desired. When the user moves his or her finger into position to depress the select area, the control unit of the image projecting device 10 changes the image being projected in direct response to the player's contact.

The image projecting device of the present invention can perceive a multitude of non-contact and contact hand gestures from the user's single or two free arms. These gestures may include the simulation of riding a virtual motorcycle, boxing a virtual opponent, climbing a virtual rope, scaling a virtual wall, swimming in virtual water, lifting a virtual barrel and/or hugging a virtual object. Further, the image projecting device can perceive two or more players making non-contact hand gestures near a single projector. This ability to detect the movement of more than one hand allows a broader range of interactive play to be possible.

Figure 9A:
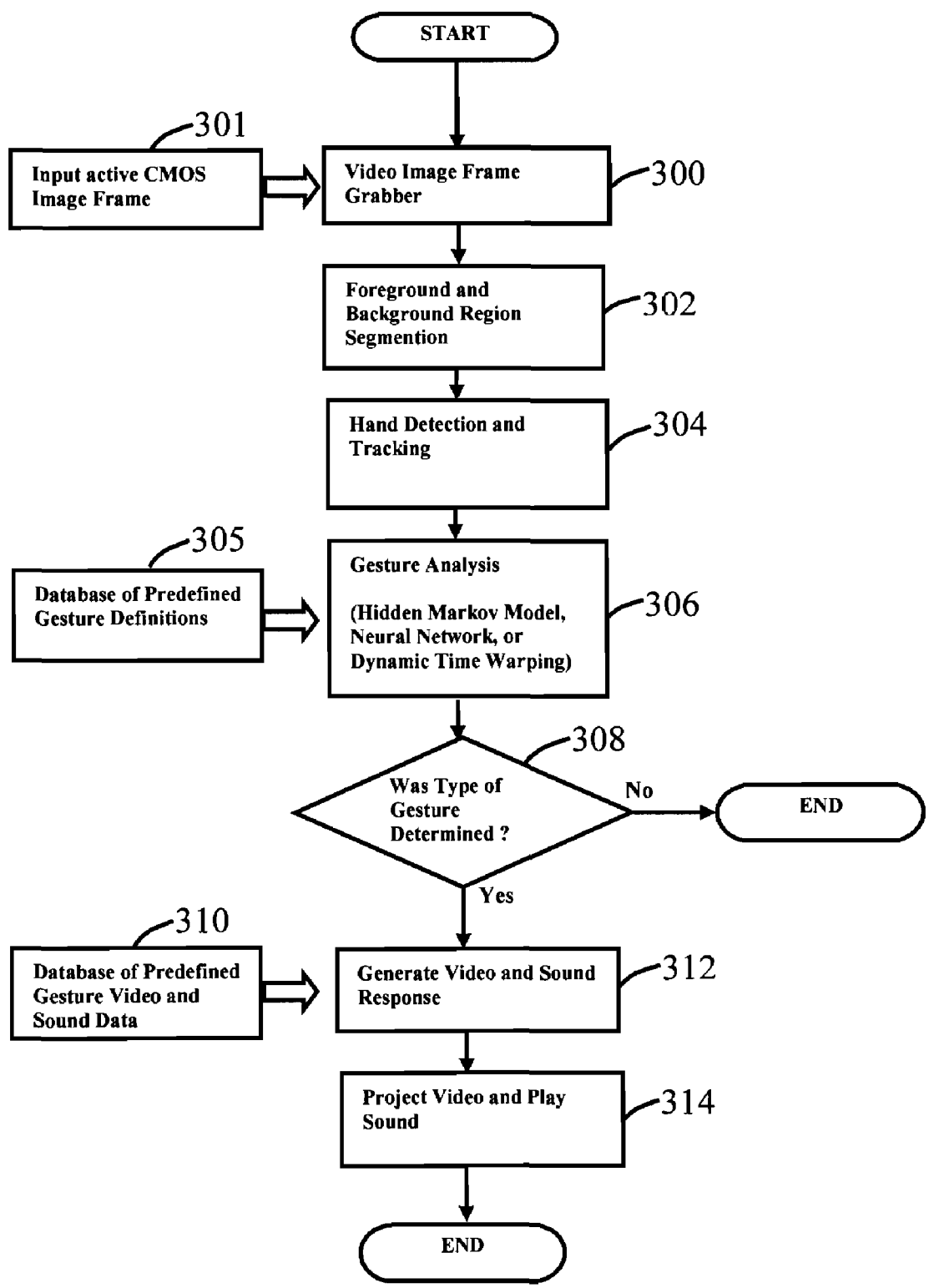
FIG. 9a is a high-level flow diagram of the control unit that enables user hand gesture observation, detection, analysis, and response.

FIG. 9*a* shows a useful high-level flow diagram of the steps the control unit makes when observing, detecting, analyzing, and responding to a hand gesture. Initially, the Video Frame Grabber module reads the CMOS camera frame and stores an image frame for future processing in step 300. The Foreground and Background Region Segmentation module scans and segments the image frame into foreground and background regions, looking for distinct qualities such as variation in brightness, shown in step 302. Once the image frame has been scanned and segmented, the Hand Detection and Tracking module seeks out the temporal and spatial points of interest, such as a blob region moving quickly left to right, recording the position and velocity of such movements in step 304. The Gesture Analysis module then takes the recorded movements and tries to find a match against a database of predefined gestures, using a Hidden Markov Model, neural network, finite state machine, or various other approaches known in the art. If a match occurs, the hand movement is classified as a specific type of gesture in step 306. If a gesture has been determined in step 308, then a complimentary video and sound response is generated in step 312 and produced in step 314.

Figure 9B:
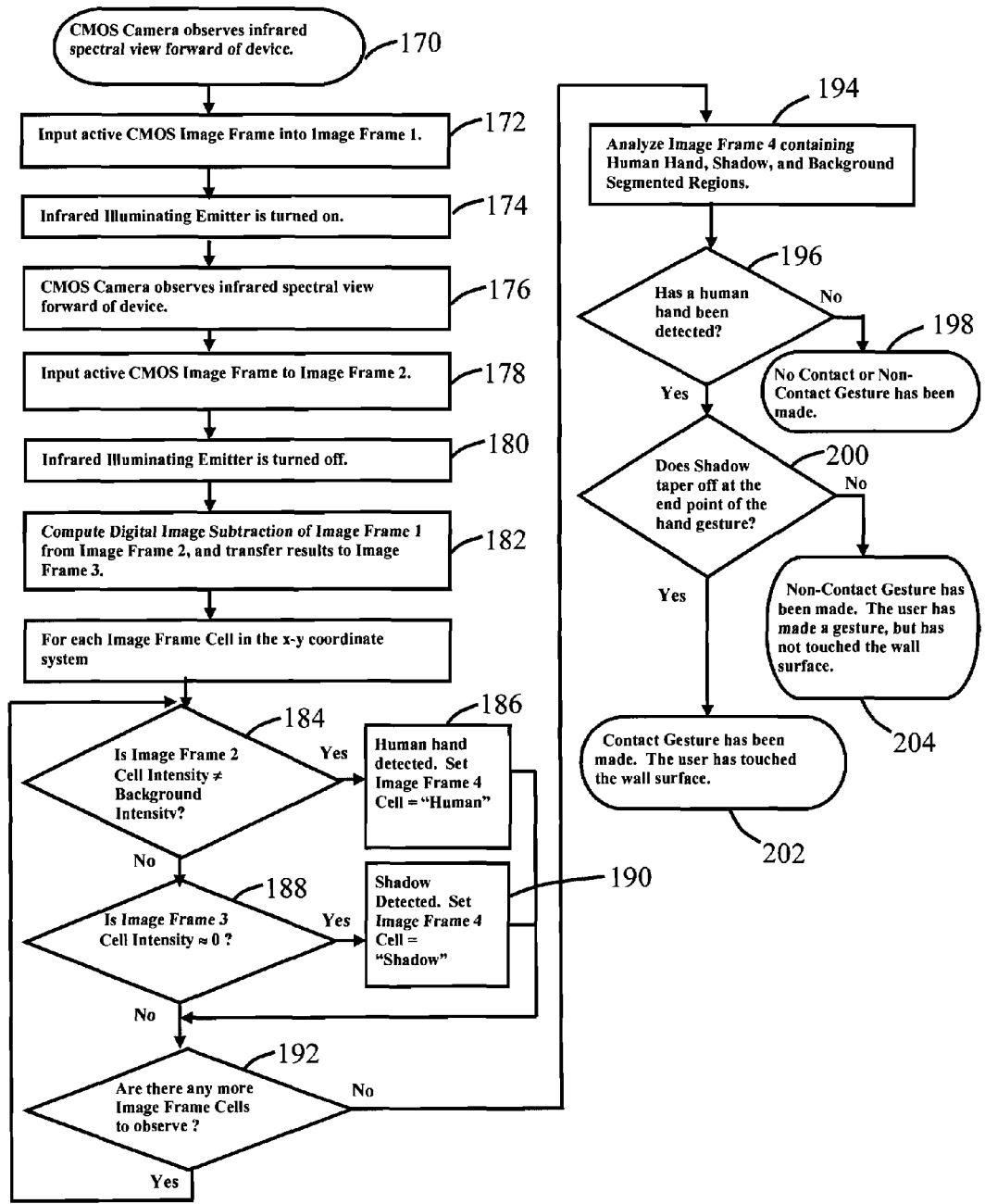
FIG. 9b illustrates the steps of the control unit that enable the image projecting device to detect hand and shadow regions during both contact and non-contact gestures.

FIG. 9*b* illustrates the operational flow steps used by the control unit of each of the image projecting devices when the image projecting device is used to detect and respond to either a non-contact hand gesture or a contact hand gesture. Initially, the image sensor, which may be a CMOS camera, observes the infrared spectral view in front of the device, as shown in step 170. The observed image from the CMOS camera is stored into memory in step 172 and the wide angle infrared illuminating emitter is turned on in step 174. As described in FIG. 6*d*, the infrared illuminating emitter creates an infrared shadow 152 that the CMOS camera observes in step 176. The image including the infrared shadow is stored into image frame 2, as shown in step 178. After the image has been recorded, the infrared illuminating emitter is turned off in step 180.

Once the first and second image frames have been stored, the control unit performs a visual image subtraction in step 182. For each image frame cell in the x-y coordinate system, the control unit determines whether the image frame cell intensity significantly differs from the background intensity in step 184. The background intensity could be computed by taking the mean average of local cell intensity, or other techniques known in the art. If the cell intensity differs from the background intensity, a human hand has been detected and the cell is classified as "human". However, if the cell intensity does not differ from the background intensity, the system determines in step 188 whether the cell intensity is approximately zero. A representation of approximately zero indicates that the cell is a shadow and is labeled as such in step 190.

If the cell is neither human nor a shadow, the system determines whether any additional cells remain and the process is continued for each individual cell. In step 194, the image frame 4 description of the human hand and shadow regions are analyzed to determine in step 196 whether a human hand has been detected. If a human hand has not been detected, then the system determines in step 198 that no contact or non-contact gesture has been made. However, if a human hand has been detected, the system determines in step 200 whether the shadow tapers off at the end point of the hand gesture. If the shadow tapers off, the system determines in step 202 that a contact gesture has been made. However, if the shadow does not taper off, no contact gesture has been made, as illustrated in step 204. By utilizing the method described in FIG. 9b, the system is able to determine whether or not a contact or non-contact gesture has been made by a player/operator.

Figure 9C:
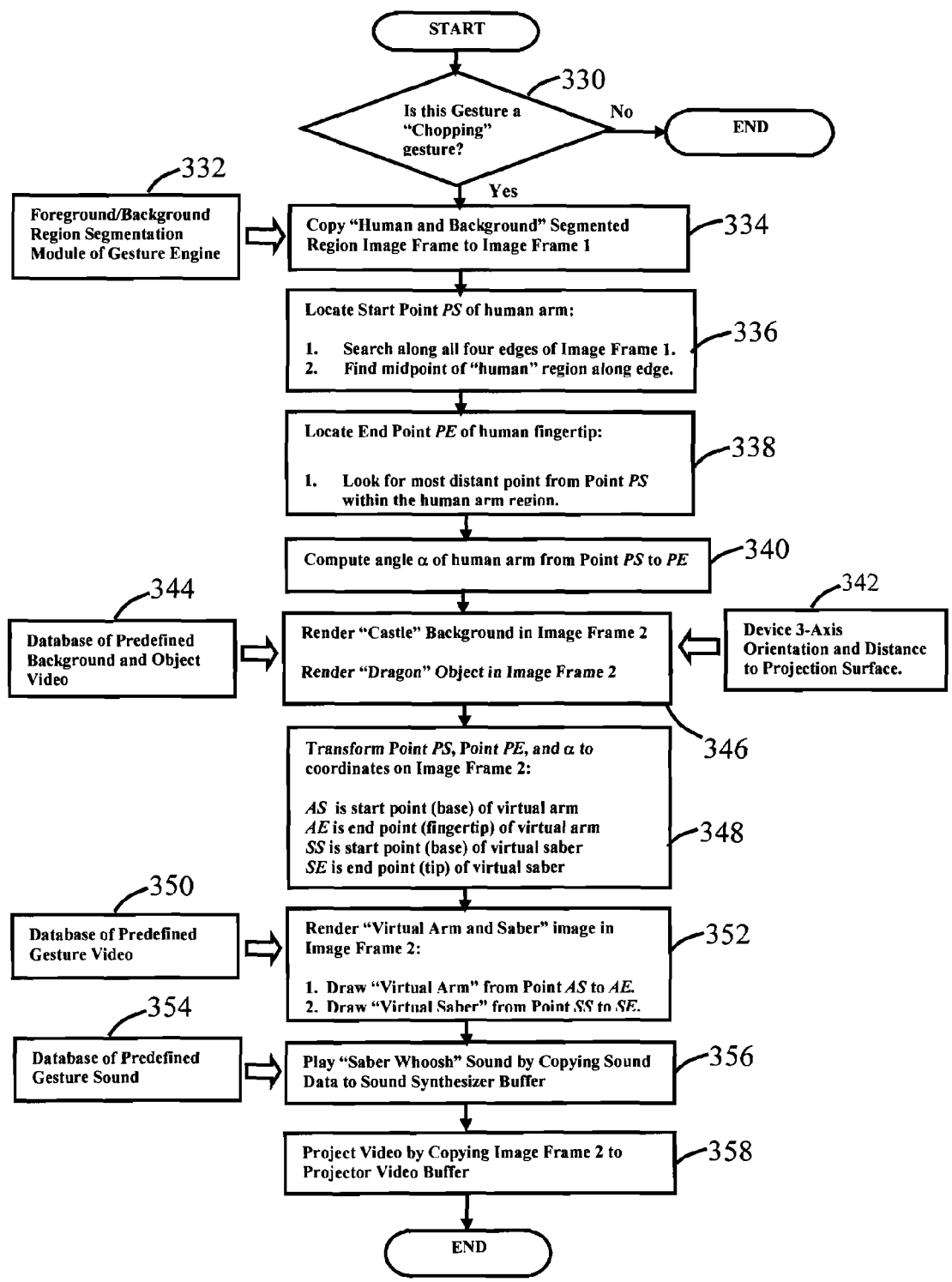
FIG. 9c shows the steps of the control unit that enables the image projecting device to respond to a "chopping" gesture.
Figure 11:
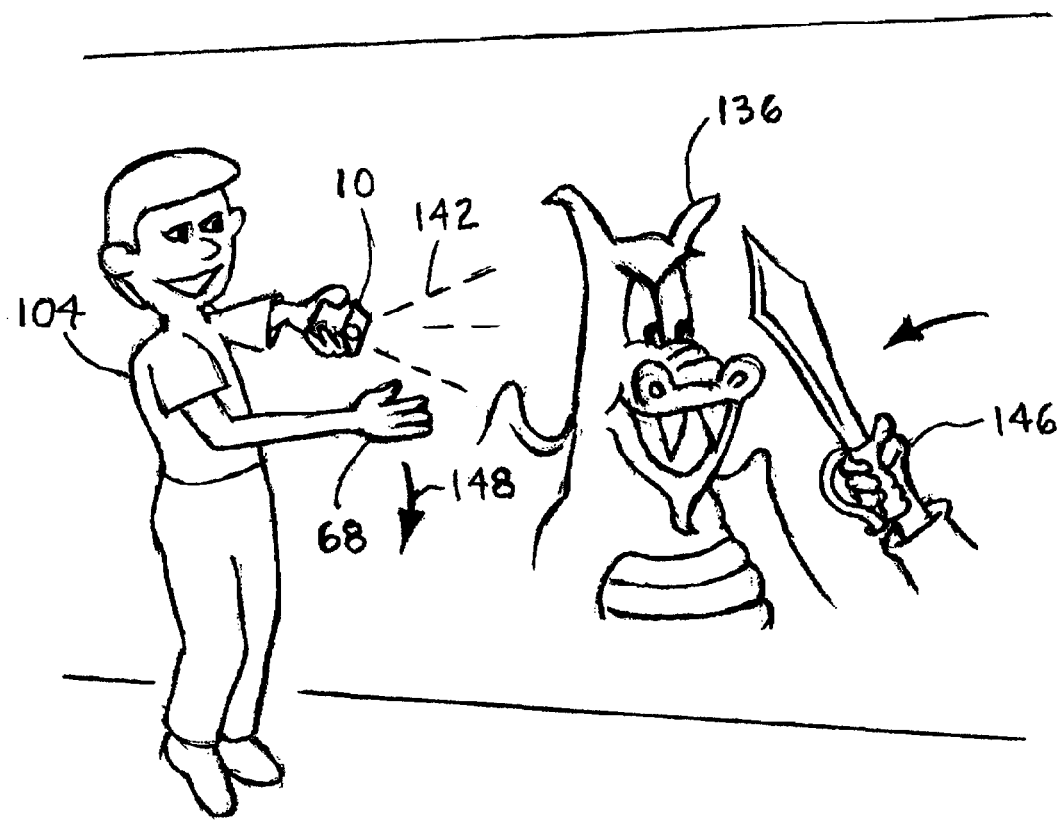
FIG. 11 illustrates a person interacting with a projected image on a wall by making a "chopping" gesture.

FIG. 9c illustrates the operational flow steps used by the control unit after a non-contact hand gesture has been detected and classified by the Gesture Analysis module. For reference, FIG. 11 shows the actual "chopping" like gesture being made by the user. Referring back to FIG. 9c, when the "chopping" gesture has been detected in step 330, the segmented image frame (containing hand and background regions) is retrieved from the gesture engine, and copied into the image frame 1, shown in step 334. Subsequently, the segmented image frame 1 is searched around its perimeter, and a mid point PS is located in the human region blob at the edge of the frame. Point PS represents the position of the base of the human arm, shown in step 336. Using a standard region scanning algorithm known in the art, the most distant point PE within the human region from point PS is located, as shown in step 338. Point PE represents the position of the hand's fingertips. A vector angle α is computed from Point PS to PE in step 340.

A graphic response can now be generated, as shown in step 346 of FIG. 9c. Initially, the "castle" background and a "dragon" object imagery is generated, transformed, and copied to image frame 2. The image generation process very much relies on the orientation of the device to the projected surface, as indicated in step 342. The previously determined points PS and PE are then mapped onto image frame 2, as x-y coordinates for the saber image and virtual arm image, shown in step 344. The saber image and virtual arm image are rendered in image frame 2 in step 352. A saber whooshing sound is retrieved from the sound database in step 354, and sent the sound synthesizer for playback in step 356. Finally, the fully rendered image frame 2 is copied into the projector video frame in step 358, for immediate light projection to the user's delight.

Further interaction capabilities can be appreciated in an embodiment where there is means for the player to interact with the projected image using sound. The image projecting device shown and described includes a microphone 49, as presented in FIG. 1 and FIG. 2, that is capable of further enhancing the interactive play experience. As an example, the image projecting device could project an image of a virtual door on a wall. If the user reaches out and knocks on the virtual door, the microphone of the image projecting device can respond to the knock by opening the projected virtual door.

Figure 12:
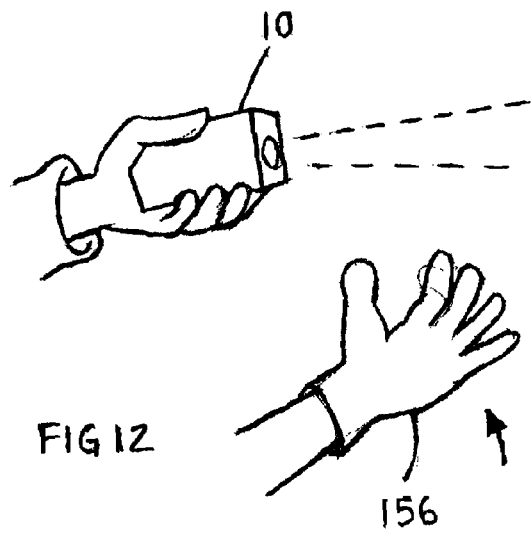
FIG. 12 illustrates the image projecting device in the left hand of a user and a supplementary gesture glove worn on the right hand.

Referring now to FIG. 12, further interaction capabilities can be appreciated by providing a supplementary passive gesture glove 156. In the embodiment shown in FIG. 12, the gesture glove 156 is made of a material that is retro-reflective to the infrared spectrum. Since the device 10 includes an infrared light emitter, the device 10 can sense the reflective infrared light coming from the glove 156. As a result, a player can move the glove 156 in 3D space and the device 10 will interpret the position, velocity and orientation of the glove 156.

Understandably, the passive gesture glove 156 of FIG. 12 is not the only possible embodiment. The glove 156 represents only one example of a means for a person to interact with the projected image. The passive gesture component could also be a ring, bracelet, shoe or hat worn by the user.

Figure 13:
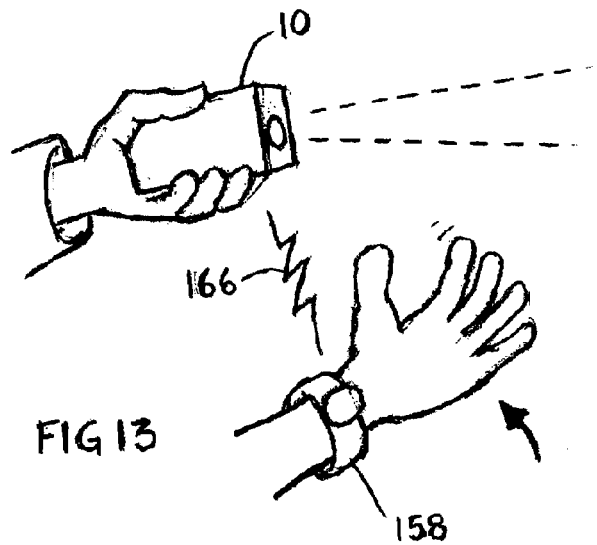
FIG. 13 illustrates the image projecting device held in the user's left hand and a supplementary gesture device attached to the user's right hand.
Figure 14:
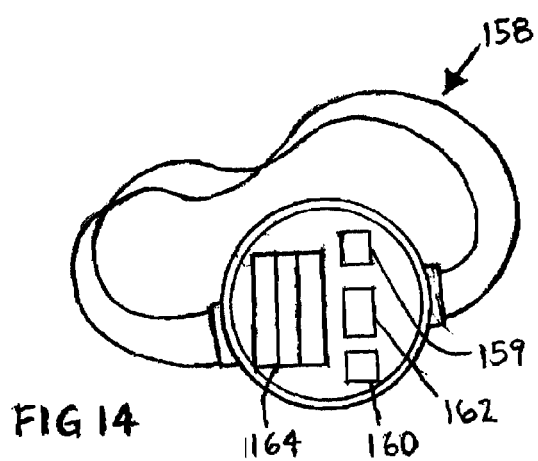
FIG. 14 shows a top view of one embodiment of the supplementary gesture device shown in FIG. 13.

FIG. 13 illustrates another type of gesture device 158. In the embodiment shown in FIGS. 13 and 14, the gesture device 158 is worn around the player's wrist and can communicate through wireless communication to the image projecting device 10. As shown in FIG. 14, the gesture device 158 can include a three axis accelerometer 159, a wireless transceiver 160, a microprocessor 162 and a battery power supply 164. When the player is using the supplementary gesture device 158 positioned on their right hand (FIG. 13), the player can make a glancing blow at the image by quickly raising the right hand. Such a movement will cause the gesture device's microprocessor to read the accelerometer 159 and send a message along with the accelerometer's values to the wireless transceiver 160. This information is received by the image projecting device 10 through the wireless transmission 166 shown in FIG. 13. In this manner, further movements of the player's hands can be more quickly and easily detected by the image projecting device 10.

As described previously, images from more than one image projecting device can respond to each other upon one of the devices detecting the image of another device. In addition, it is contemplated that the images from more than one image processing device can be synchronized to provide a single, coherent image result. This single, coherent image result is important in game play since there may be multiple players, each holding a device 10, interacting in the same 3D virtual space. That is, when two projected images happen to overlap, the user should not see two unrelated images, but rather a single, coherent image of a common virtual space.

Figure 15A:
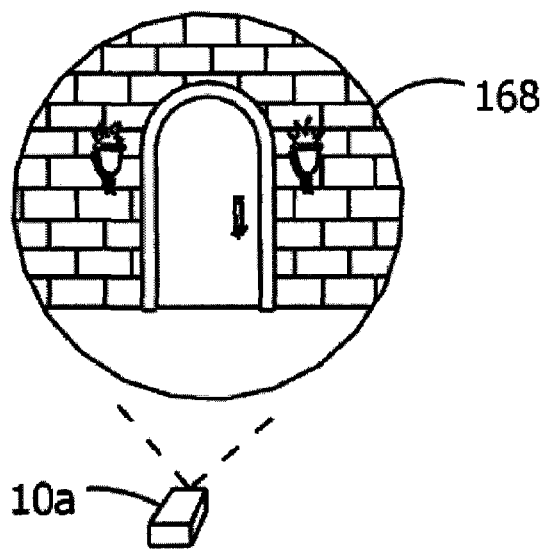
FIG. 15a shows the projected image from one of the image projecting devices.
Figure 15B:
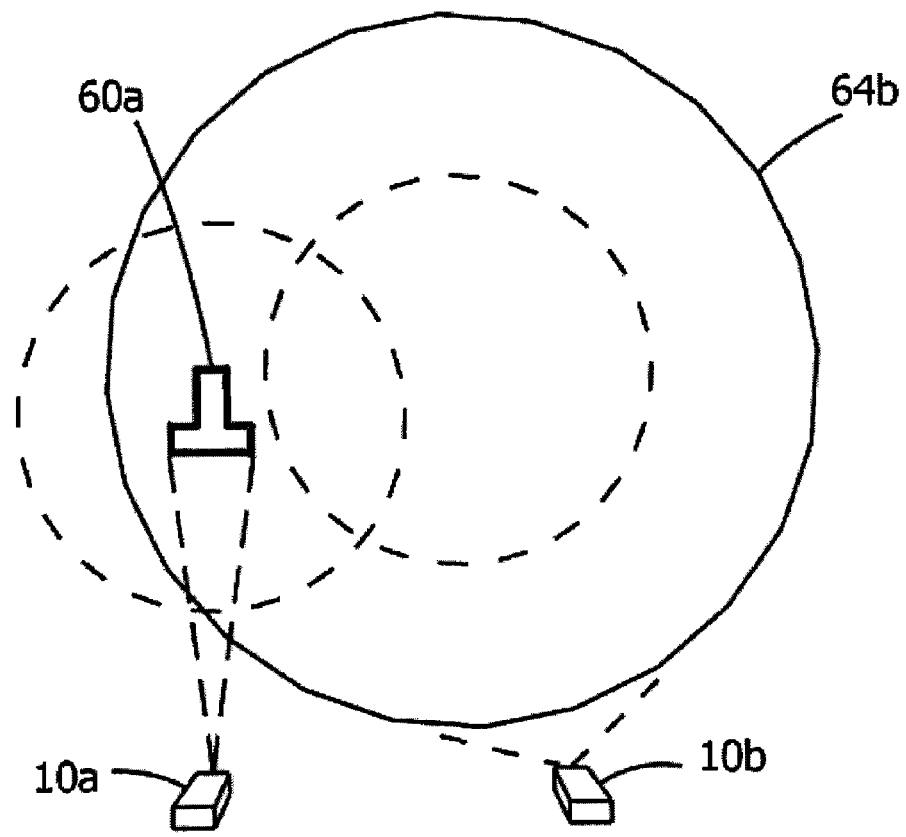
FIG. 15b shows the image sensor view from one of the image projection devices and the infrared position indicator from another of the image projecting devices.
Figure 15C:
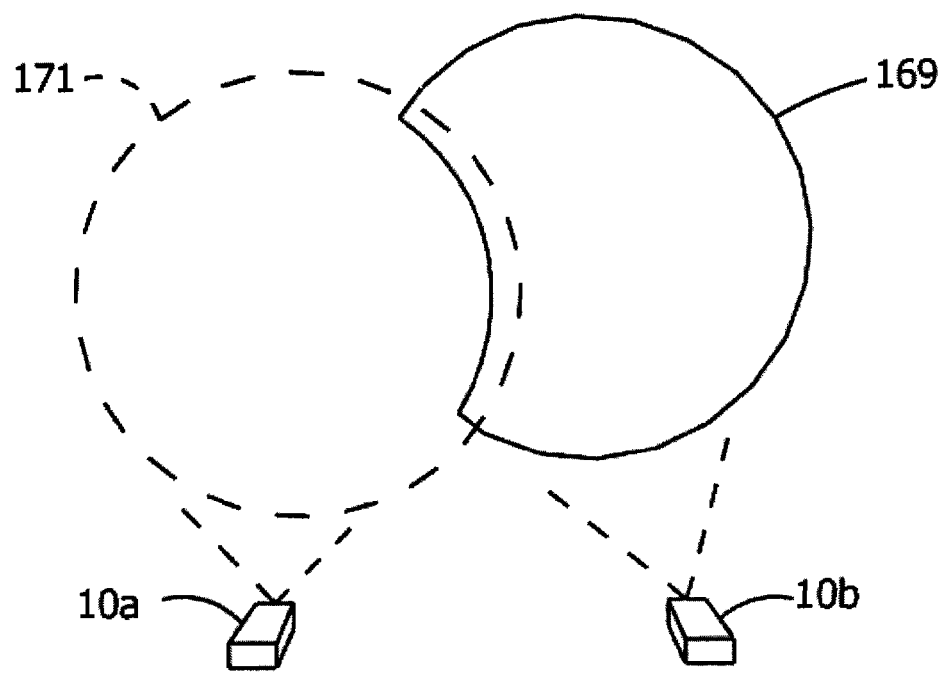
FIG. 15c shows the clipping of the projected visible image from one device.
Figure 15D:
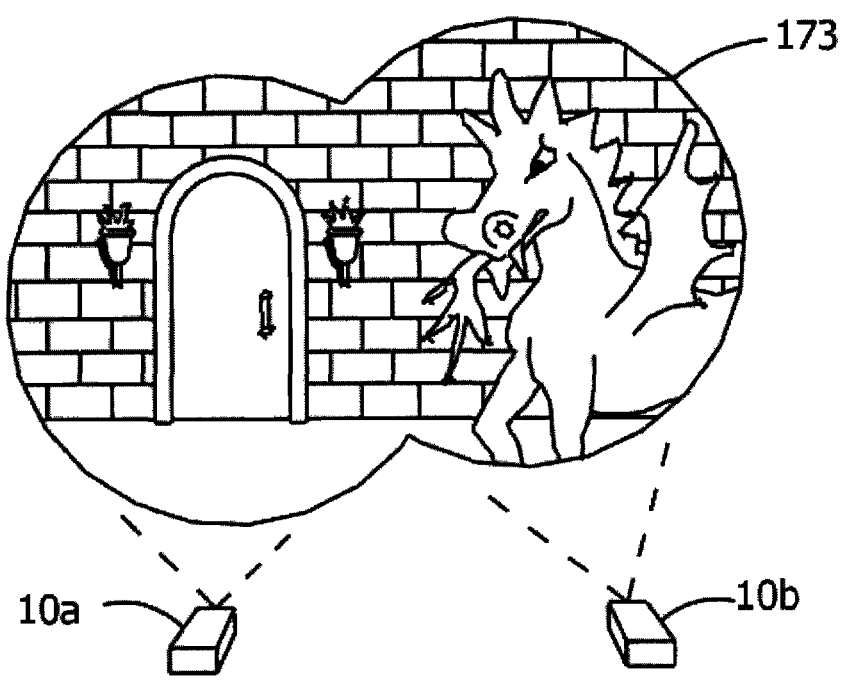
FIG. 15d shows the resulting display of a single monolithic image projected from a pair of image projecting devices.

FIG. 15a illustrates a projected visual image 168 of a castle from a device 10a. Nearby, a second device 10b is also projecting a visible image of a different portion of the same castle. As the images move closer together, both devices need to synchronize their images and can carry out such function as follows. As shown in FIG. 15b, device 10a is shining its infrared position indicating emitter to create the position indicator 60a on the wall. The position indicator 60a appears within the infrared camera viewing field 64b of the second device 10b. The first infrared emitter 60a not only enables a relative x-y coordinate to be determined, but also the relative angle and relative dimension of one image with respect to another. Upon detecting the position indicator 60a, device 10b computes the relative x-y coordinates, relative angle, and relative dimension of the projected image of device 10a. As a result, device 10b can adjust its image by digitally panning, rotating, zooming in or out, and clipping until image alignment is achieved. FIG. 15c shows the projected image 169 of device 10b being clipped along the edge for overlap with the image 171 from device 10a. FIG. 15d illustrates the resulting combined image 173 from both devices 10a and 10b.

In addition to the interaction between the images from each device, it is also contemplated that the devices held by multiple players can interact with each other in the same virtual space. As an example, assume a first player has killed a dragon at a first virtual location. If the second player travels to the same location, the second player will not see a live dragon, but rather will find an already slain dragon. As a result, players may work together to solve common tasks.

Such a feat is carried out using data synchronization by way of a master-slave device protocol. Specifically, one of the devices is defined as the master device, which holds the up to date "master" copy of the state of all local virtual objects, such as object type, position, velocity, strength, etc. When a slave device alters a virtual object, its wireless transceiver sends a message to the master device indicating the new data state of the object. The master device then updates the corresponding object in its memory space and wirelessly broadcasts the data state of the virtual space and objects to all of the surrounding slave devices, using its built-in wireless transceiver. Typically, the master device broadcast rate would be every 1/10 to 1/1,000 of a second so that the nearby slave devices are kept up to date with timely data.

Figure 17:
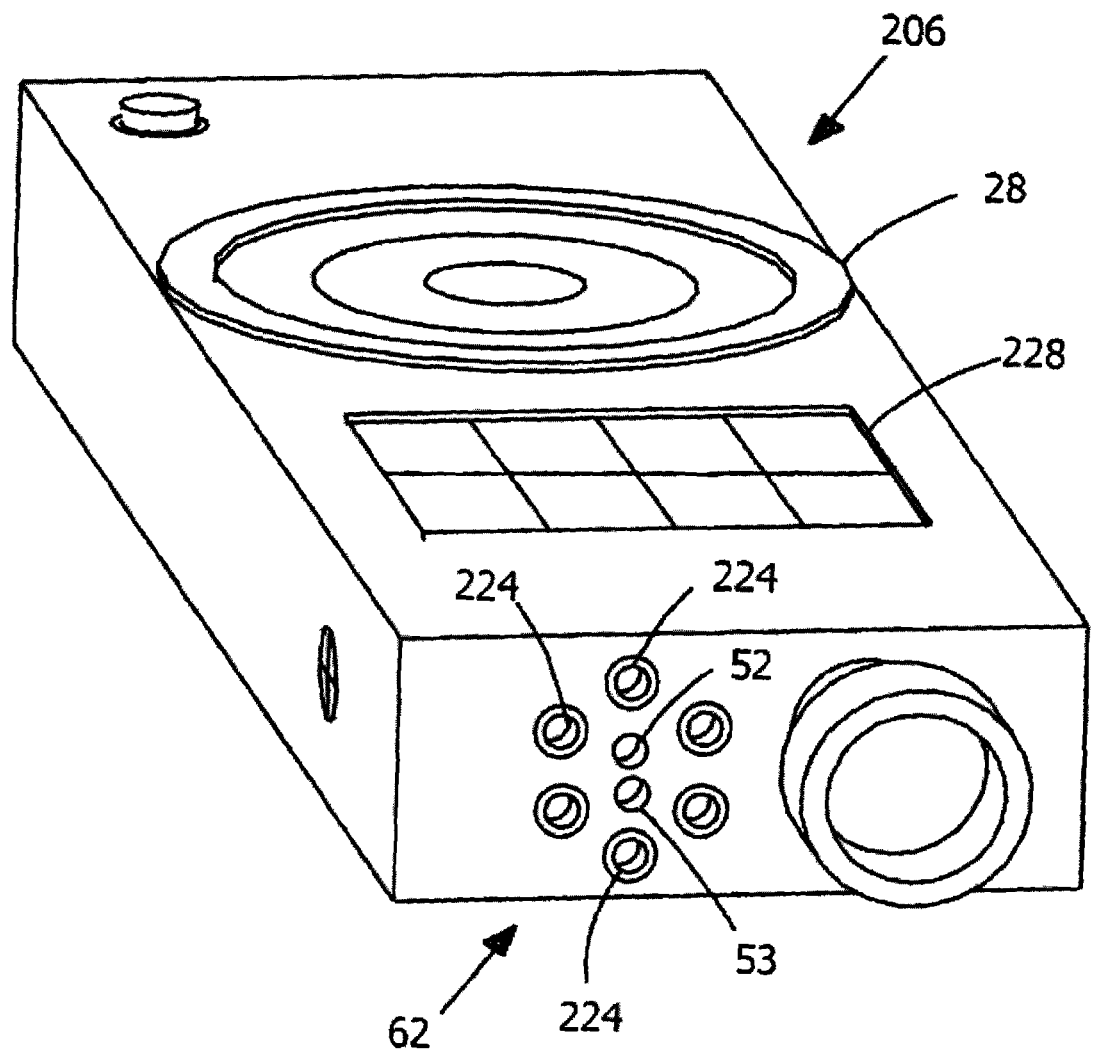
FIG. 17 shows a second, alternate embodiment of the image projecting device of the present invention.
Figure 18:
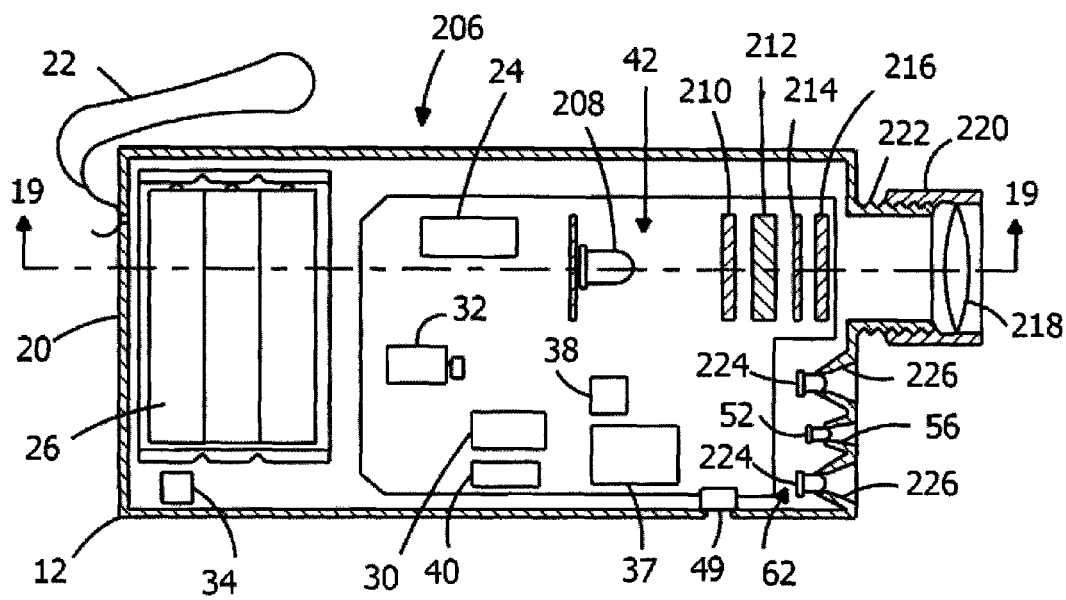
FIG. 18 shows a top, internal view of the second, alternate embodiment of FIG. 17.
Figure 19:
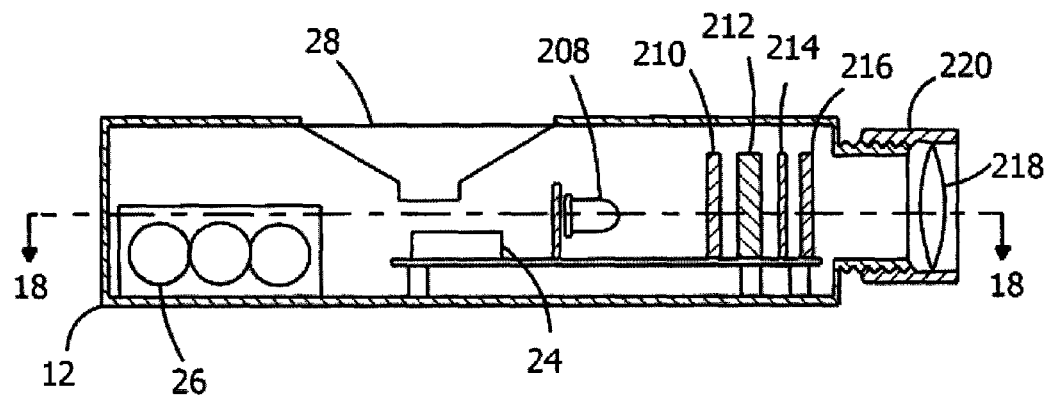
FIG. 19 shows a side, internal view of the second, alternate embodiment.

FIGS. 17-19 illustrate an alternate embodiment of an image projecting device, as referred to by reference numeral 206. In the second embodiment shown in FIGS. 17-19, similar reference numerals are utilized for common components with respect to the first embodiment shown in FIGS. 1-3.

As can best be seen in FIG. 18, the projector 42 is a low-cost LED based projector system. Specifically, the projector 42 includes a white LED 208 that shines white visible light on a Fresnel lens 210, which collimates the light into parallel rays. The light rays are then transmitted through a monochrome LCD 212 that allows light to pass only where the image pixels are transparent and the light is blocked where the image pixels are opaque. The modulated light then passes through a multi-color plastic film sheet 214, which is an inexpensive means to color the projected image, and onto the front Fresnel lens 216, which causes light to converge toward the lens apparatus. The light is then transmitted through an optical focusing lens 218 mounted within an outer housing 220 that is threadedly received along the neck 222. The rotation of the housing 220 allows the image to be focused at the desired focal length depending upon the distance of the image projecting device 206 from the image surface. The use of the LED 208 as the projector is a low-cost version of the image projecting device 206, as compared to the laser-based projector of the first embodiment.

In addition to the replacement of the projector 42, the embodiment shown in FIG. 18 includes an alternate version of an image sensor 62. As best seen in FIG. 17, the image sensor 62 has been replaced by six, low-cost, infrared sensors 224. As illustrated in FIG. 18, each of the sensors 224 sits deep in a round-shaped focusing waveguide 226 that creates a constant viewing angle for each of the sensors 224. Preferably, the round-shaped focusing waveguide 226 is a cavity or depression in the body of the device 206. Typically, each of the sensors 224 has a viewing angle of anywhere between 10°-30°, which is dictated by the waveguide 226.

Each of the sensors 224 is in operative communication with the control unit 24 such that information from the sensors can be received and interpreted by the control unit 24. Like the first embodiment, the second embodiment of the image projecting device 206 also includes a position indicating emitter 52 positioned behind a waveguide 56. In addition, as shown in FIG. 17, the second embodiment includes a second position indicating emitter 53 behind a waveguide located below position indicating emitter 52.

Figure 21A:
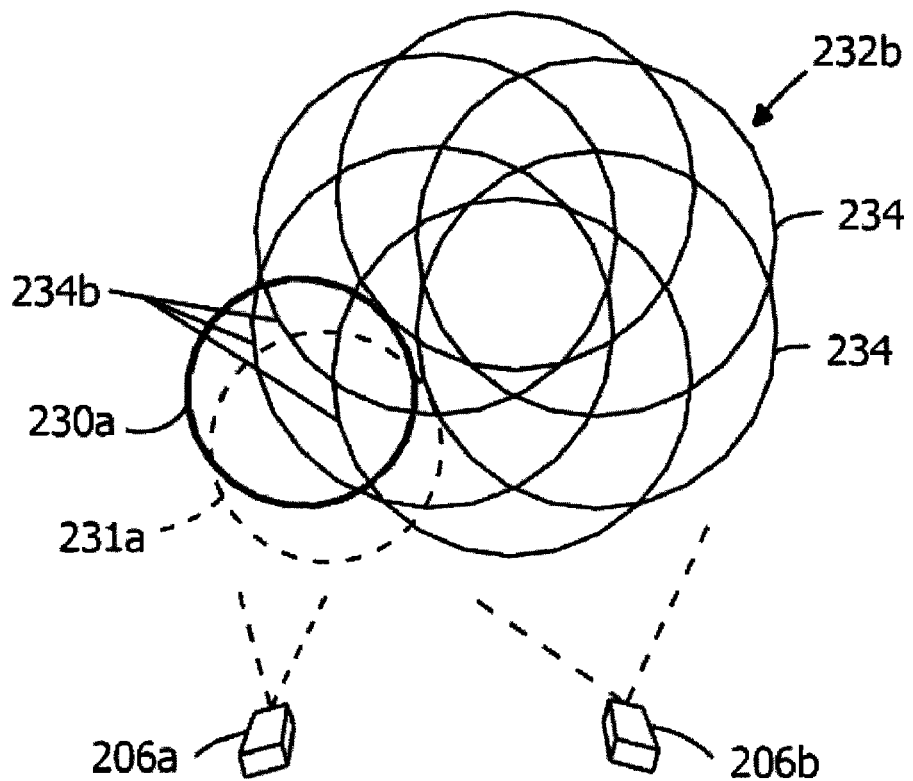
FIGS. 21a and 21b illustrate the image sensing views and position indicators from the pair of the image projecting devices.

In the embodiment shown in FIG. 18, the longitudinal axis of each round-shaped focusing waveguide 226 is not parallel, but each axis exists on a diverging angle from the position indicating emitter 52 longitudinal axis. This results in the sensor's viewing angles being divergent, allowing the device to observe an overall larger field of view with greater spatial positional resolving capabilities. A representation of the viewing fields 234 for the sensors 224 is shown in FIG. 21a.

In the embodiment shown in FIG. 17, the device includes a keypad 228 that includes a series of touch-sensitive buttons for providing various distinct operating functions.

Figure 20:
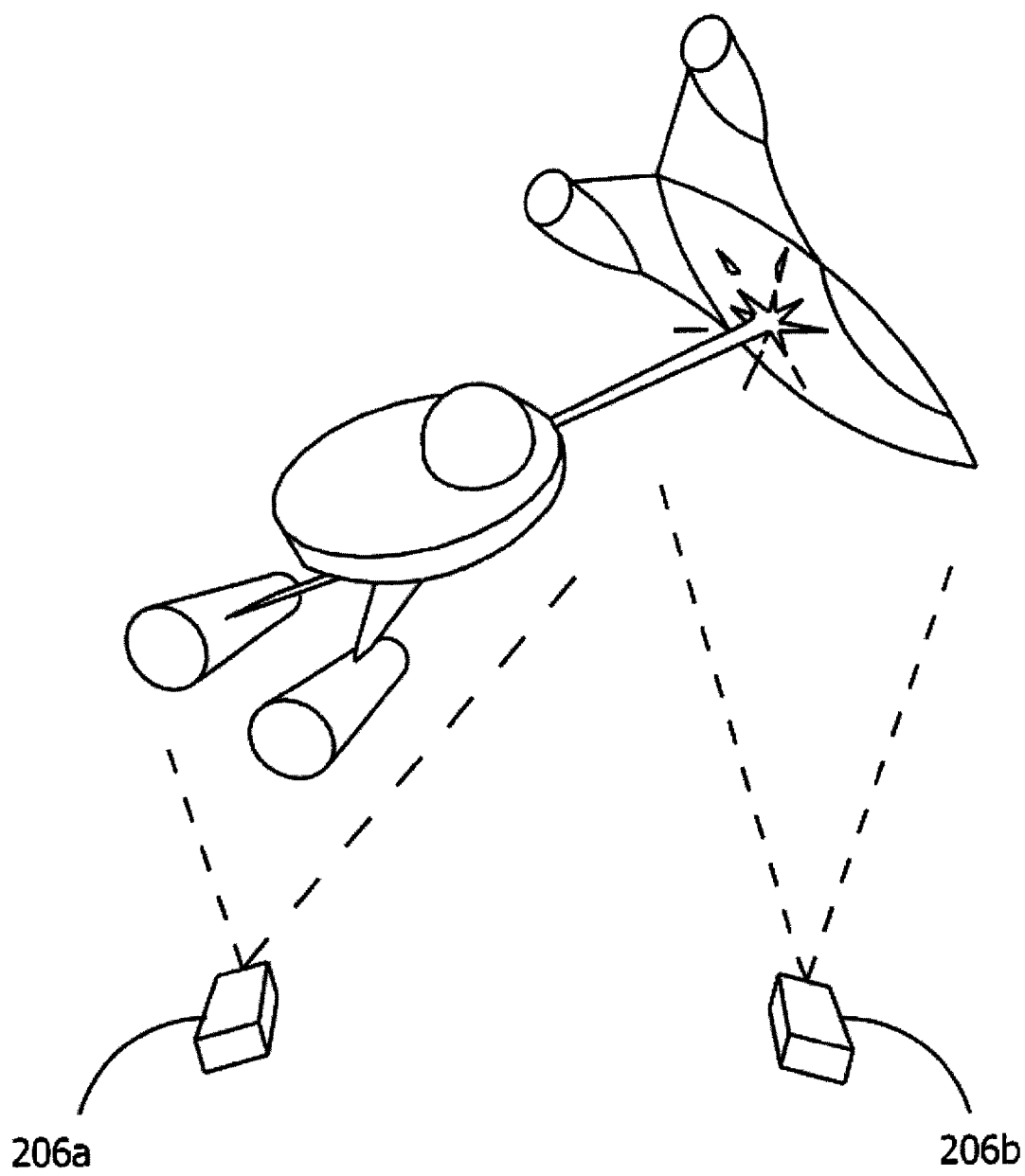
FIG. 20 shows a pair of images projected from the image projecting devices of FIG. 17.

FIG. 20 shows a virtual spaceship projected by device 206a, and a virtual rocket being projected by device 206b. Assume that the user of device 206a has pressed touch-sensitive keypad 228 button to "fire laser." The result is the microprocessor of device 206a sends video data to its projector system showing its projected image of a spaceship firing a laser, as shown in FIG. 20. Immediately following the visible light projection of the spaceship firing a laser, FIG. 21a shows device 206a shining a first infrared beam at the wall for a brief period, such as 1/100 second. This first beam originates from position indicating emitter 52. In addition, the modulated infrared beam is encoded with a message from device 206a essentially reading:

Device_Id=device 206a unique identifier
Device_Indicator_Position=ON
Object_Id=Blaster
Object_Type=spaceship
Object_Orientation=Facing right
Object_Activity=fired laser, 45 degree angle, r=20 units
Image_Displacement=0, −2
Image_Dimension=22, 22
Image_Rotation_Angle=120

Once 1/100 second has elapsed, device 206a turns off the first beam and turns on a second infrared beam for a 1/100 second duration. This second beam originates from position indicating emitter 53.

During which time, the first beam's infrared message from device 206a is received by device 206b. Specifically, device 206b contains the six infrared sensors 224 that combine for the infrared sensor view 232b of the wall on which the reflected infrared spot 230a appears. The result is that some of the infrared sensors will detect the reflected infrared light, and the other sensors will not. Hence, the position of the device 206a projected spaceship, which is the center of the infrared spot 230, relative to device 206b projected rocket may be computationally determined. Device 206b has its control unit, via a standard analog-to-digital converter, read the analog values of all six infrared sensors 224 and sees that several of the infrared sensors 234 have significantly higher binary values (where binary values are in proportion to brightness). Subsequently, the device 206b has its microprocessor determine the spaceship's x-y coordinates by:

spaceship_relative_x=device 206a_infrared_x−device 206b_camera_center_x spaceship_relative_y=device 206a_infrared_y−device 206b_camera_center_y where spaceship_relative_x is the spaceship's x-coordinate relative to the rocket's x-coordinate
spaceship_relative_y is the spaceship's y-coordinate relative to the rocket's y-coordinate device 206*a*_infrared_x is device 206*a* infrared beam's x-coordinate device 206*a*_infrared_y is device 206*a* infrared beam's y-coordinate device 206*b*_camera_center_x is device 206*b* camera center x-coordinate (origin)

device 206*b*_camera_center_y is device 206*b* camera center y-coordinate (origin)

In addition, the microprocessor of device 206*b* is able to read device 206*a* encoded message (defined above) by using its six infrared sensors 224. Since the infrared beam is encoded with a message, the infrared spot 230*a* will fluctuate in magnitude in proportion to the magnitude of the encoded signal from device 206*a*. Hence, the microprocessor control unit will be able to convert its infrared sensor fluctuating brightness into the message indicating a spaceship has fired its laser.

About 1/100 second later, the second infrared beam of device 206*a* is received by device 206*b*. That is, the microprocessor of device 206*b* reads its six infrared sensors 224, and computes the x-y position of infrared spot 231*a*. Whereby, the microprocessor then computes the relative rotation angle of the spaceship by determining the vector angle of infrared spots 231*a* and 230*a*.

The software on device 206*b* determines that given the angle and length of the laser from the spaceship, and the relative x-y position and rotation angle of the spaceship, the rocket has been hit. Whereby device 206*b* has its microprocessor send video content to its projector showing the rocket has been hit. In addition, the microprocessor of device 206*b* increments the rocket's damage attribute contained in its software to reflect the laser hit.

Figure 21B:
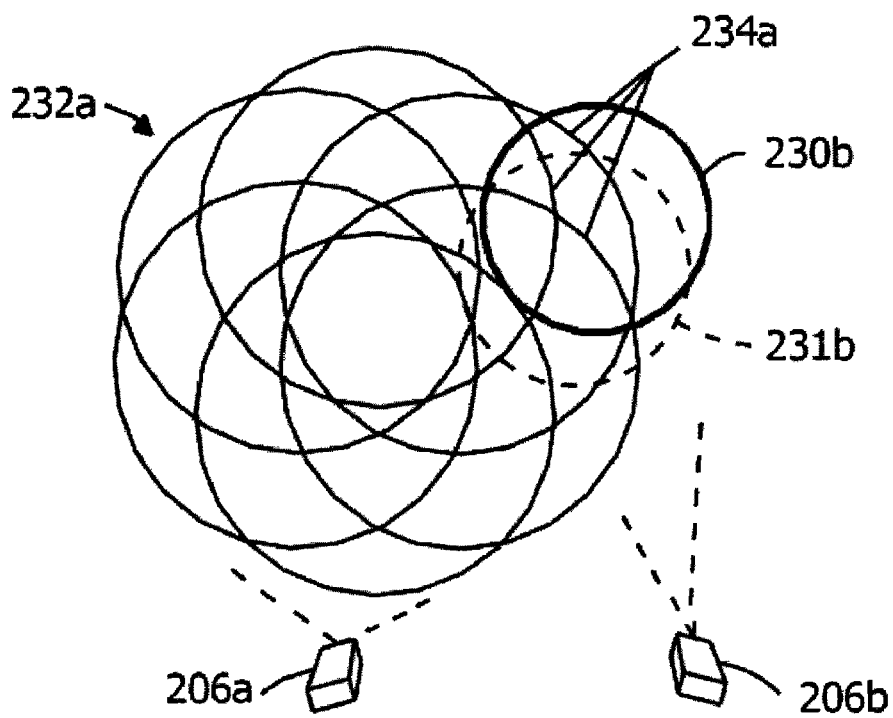

FIG. 21*b* shows device 206*b* shining an infrared beam 230*b* at the wall for a brief period, such as 1/100 second. In addition, the modulated infrared beam is encoded with a message from device 206*b* essentially reading:

Device_Id=device 206*b* unique identifier
Device_Indicator_Position=ON
Object_Id=Speedy
Object_Type=rocket,
Object_Orientation=Facing right
Object_Activity_Device_Id=device 206*a* unique identifier
Object_Activity=award 10 points
Image_Displacement=0, 0
Image_Dimension=20, 20
Image_Rotation_Angle=45

The infrared message from device 206*b* is received by device 206*a*. That is, device 206*a* contains six infrared sensors 224, which has an infrared sensor view 232*a* of the wall on which the reflected infrared spot 230*b* appears. The result is sensors 234*a* will detect the reflected infrared light, and the other sensors will not. Hence, the position of device 206*b* projected rocket, which is the center of the infrared spot 230*b*, relative to device 206*a* projected spaceship may be computationally determined. Device 206*a* has its microprocessor, via a standard analog-to-digital converter, read the analog values of all six infrared sensors 224 and sees that infrared sensors 234*a* have significantly higher binary values (where binary values are in proportion to brightness). Subsequently, the device 206*a* has its microprocessor determine the rocket's x-y coordinates by:

rocket_relative_x=device 206*b*_infrared_x–device 206*a*_camera_center_x rocket_relative_y=device 206*b*_infrared_y–device 206*a*_camera_center_y where rocket_relative_x is the rocket's x-coordinate relative to the spaceship's x-coordinate rocket_relative_y is the rocket's y-coordinate relative to the spaceship's y-coordinate device 206*b*_infrared_x is device 206*b* infrared beam's x-coordinate device 206*b*_infrared_y is device 206*b* infrared beam's y-coordinate device 206*a*_camera_center_x is device 206*a* camera center x-coordinate (origin)

device 206*a*_camera_center_y is device 206*a* camera center y-coordinate (origin)

In addition, microprocessor of device 206*a* is able to read device 206*b* encoded message (defined above) by using its six infrared sensors 224. Since the infrared beam is encoded with a message, the infrared spot 230*b* will fluctuate in magnitude in proportion to the magnitude of the encoded signal from device 206*b*. Hence, the microprocessor will be able to convert its infrared sensor 224 fluctuating brightness back into the message indicating the awarding of 10 points.

About 1/100 second later, the second infrared beam of device 206*b* is received by device 206*a*. That is, the microprocessor of device 206*a* reads its six infrared sensors 224, and computes the x-y position of infrared spot 231*b*. Whereby, the microprocessor then computes the relative rotation angle of the rocket by determining the vector angle of infrared spots 231*b* and 230*b*.

The software on device 206*a* then adds ten points to the user's score. In addition, device 206*a* has its microprocessor send video content to its projector showing the 10 points have been added.

Understandably, the exchange of communication between the devices, and subsequent graphic and sound responses can go on indefinitely or at least until one of the device's batteries or rechargeable power supply is depleted.

Figure 22:
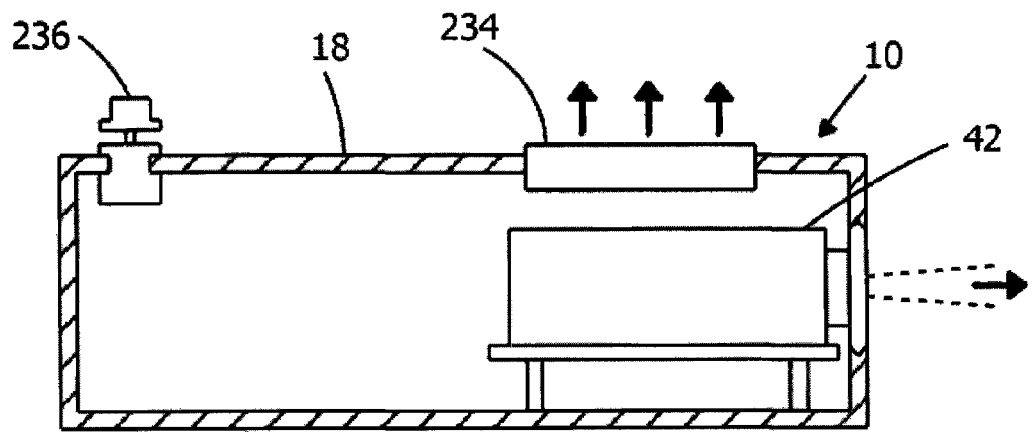
FIG. 22 shows a diagrammatic side section view of a third, alternate embodiment.

FIG. 22 illustrates another embodiment of the image projecting device as shown in FIG. 22. The embodiment shown in FIG. 22 is similar to the embodiment shown in FIG. 1 except that the embodiment shown in FIG. 22 includes a color LCD 234 mounted to the top surface 18. Further, the device shown in FIG. 22 includes a toggle switch 236 mounted on the device body. During operation, the toggle switch 236 can be depressed to activate the color LCD 234 while at the same time deactivating the projector 42. The color LCD 234 facilitates viewing an image in a brightly lit area or when ambient viewing surfaces may not be available.

When a nearby wall or surface is available along with low light conditions ideal for image projection, the user can depress the toggle switch 236 to deactivate the color LCD 234 and activate the projector 42.

Figure 23:
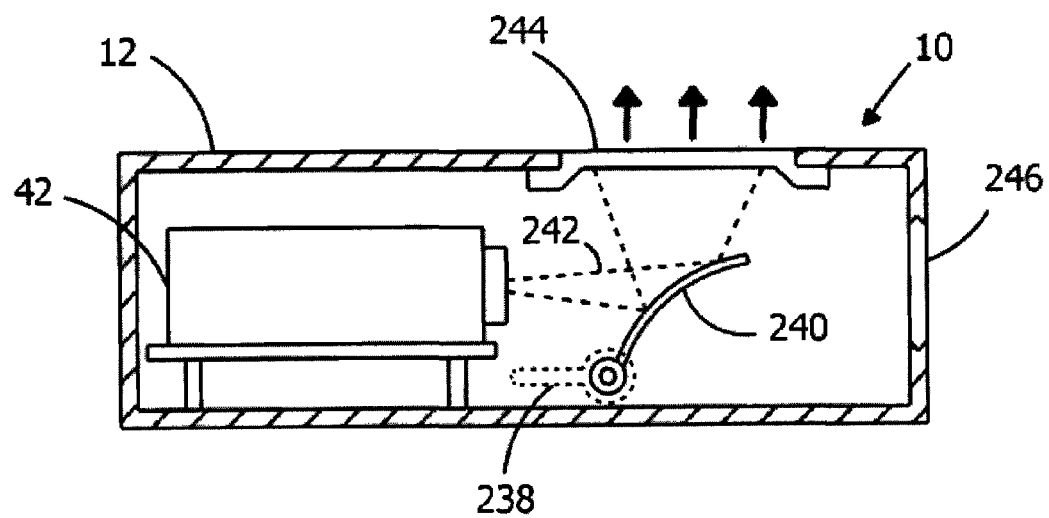
FIG. 23 shows a diagrammatic side view of a fourth, alternate embodiment.

FIG. 23 illustrates yet another alternate embodiment of the image projecting device 10. In the embodiment shown in FIG. 23, the device includes a rotating display mode lever 238 on the outside of the device that the player may rotate in a clockwise or counterclockwise motion within a 45° range of movement. A pivoting light reflector 240 exists in the path of the projected beam 242 from the projector 42 that allows the beam to be deflected in various directions within the outer housing 12. The light reflector 240 is preferably constructed from a plastic or metal material that is coated with a mirror-like reflective surface using vacuum metal deposition or scintillation processes. The pivoting light reflector may have a shaped or curved design, resulting in a reflected beam of the desired divergent angle. The outer housing includes a translucent display 244 that is capable of transmitting visible light from its back to its front surface, enabling one to view a displayed image. The frosted or diffused transparent material 244 may be made of such things as injection-molded acrylic, polycarbonate or acetate.

During operation, the user may toggle between viewing the on-board display and viewing the projected display. For example, to view the on-board display 244, the user rotates the lever 238 counter-clockwise until it reaches a stop position. As a result, the light reflector 240 will reflect light from the projector 42 into the back of the display 244 where it can be viewed by a user. If the user no longer wishes to view the display 244, the lever 238 is rotated in the opposite direction to move the light reflector 240 out of the projected beam of light 242. When the light reflector is rotated out of the beam 242, the light will pass through the transparent protective cover 246 and onto a nearby viewing surface.

Figure 24:
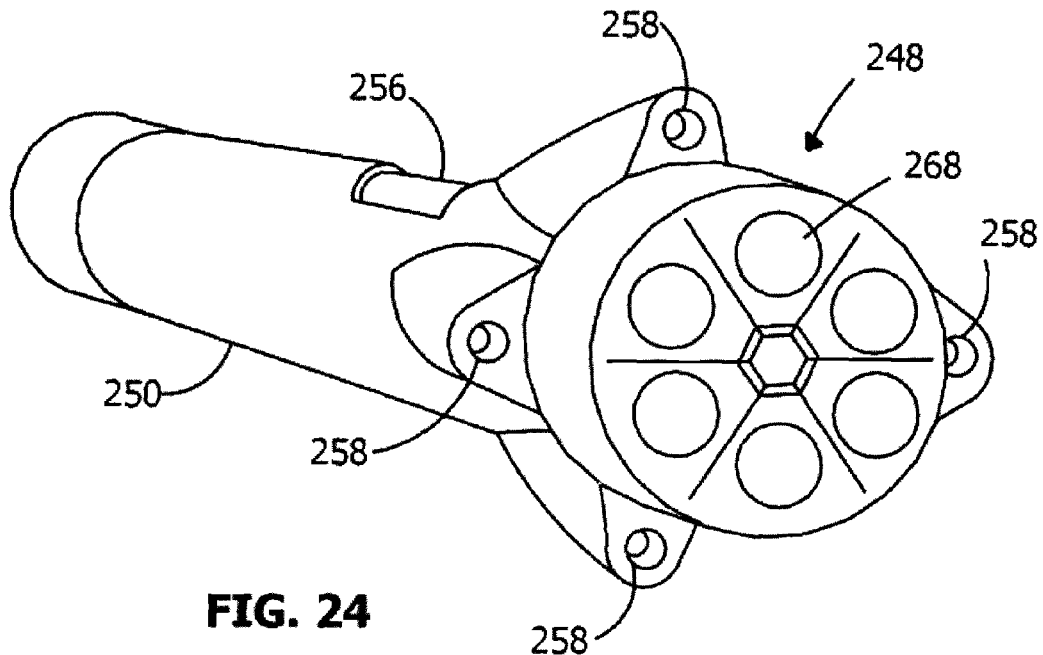
FIG. 24 is a perspective view of a fifth embodiment of the interactive image projecting device of the present invention.
Figure 25:
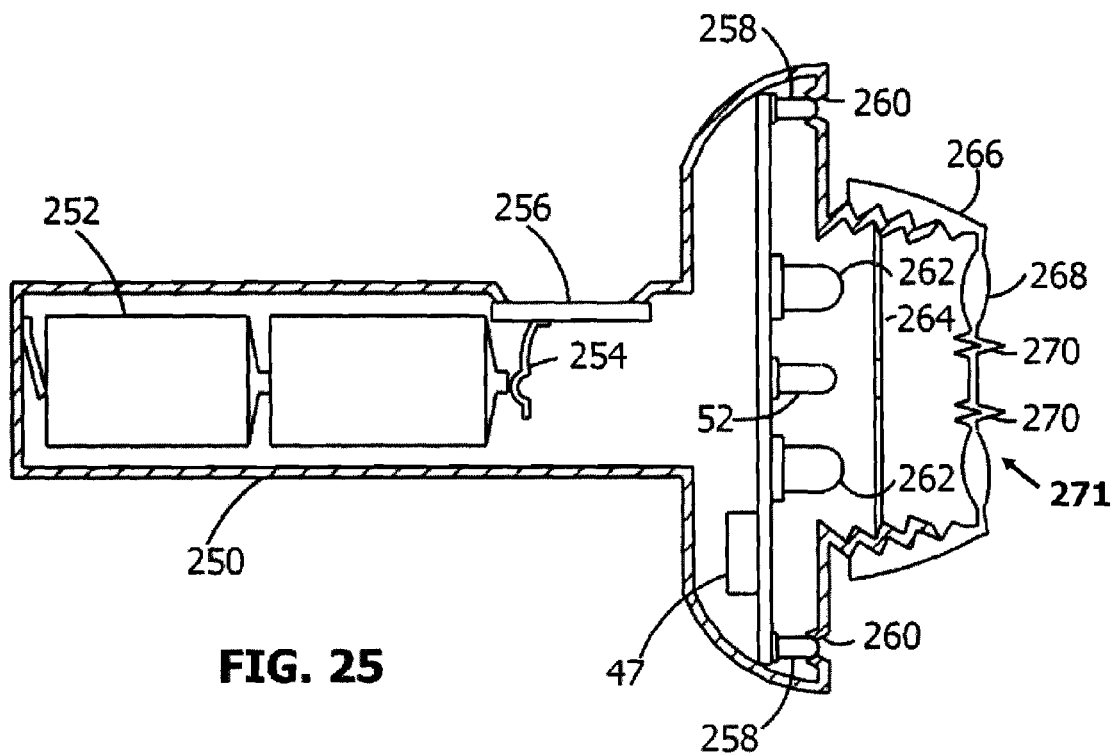
FIG. 25 is a side, internal view of the image projecting device shown in FIG. 24.

Referring now to FIGS. 24 and 25, thereshown is yet another alternate embodiment of the image projecting device, as referred to by reference numeral 248. In the embodiment shown in FIGS. 24 and 25, the device 248 has the general configuration and shape of a flashlight that includes a handle 250 sized to receive a pair of batteries 252. The batteries 252 are in contact with a contact 254 coupled to a touch pad 256. In the embodiment shown in FIG. 4, the device 248 includes four infrared photo sensors 258 placed at four equally spaced points around the generally circular outer circumference of the device. Each of the photo sensors 258 is aligned with a waveguide 260, as shown by the section view of FIG. 25. The waveguide 260 controls the viewing angle of each of the infrared sensors 258.

In the embodiment shown in FIG. 25, the laser-projector of the first embodiment is replaced by a collection of six white LEDs 262, a translucent multi-image film 264 and a focusing multi-lens barrel 266. Typically, each of the LEDs 262 has a projection angle of about 5°-20°. The translucent multi-image film 264 is a collection of six distinct images, lithographically printed with translucent ink on a transparent polymer, such as acetate or acrylic. It is assumed that there is a distinct image forward of each white LED 262. Preferably, the lens barrel 266 is of an injection-molded transparent and flexible polymer part, made of acrylic, PET or polycarbonate. The lens barrel has been segmented into six sectors, where each lens 268 is surrounded by an in-molded living hinge 270 allowing all of the lenses to expand and collapse radially around the barrel center.

In the embodiment shown, the device includes a position indicating emitter 52 that projects an infrared image through the center of the film 264 and onto the projection surface.

During operation of the device shown in FIGS. 24 and 25, the user initially turns on the device by touching the touch-sensitive keypad 256. Once turned on, the control unit 47 coordinates the activation and deactivation of the LEDs 262. When the white LED 262 is activated, white visible light is projected forward, transmitted through the colored image film 264 that produces filtered color light that is refracted by the optical lens 268, producing a viewable image on an ambient surface. A projected animated image is achieved by the projector system by deactivating the light LED associated with the undesired image and activating the white LED associated with the desired image. By coordinating the activation of the LEDs 262, the control unit 47 can create an animated image.

Focusing of the image on an ambient surface can be accomplished by turning the lens barrel 266 clockwise or counter-clockwise until the image becomes clear. When the user turns the lens barrel 266 clockwise and toward the LEDs 262, the barrel cap 271 has a slight concave curvature, enabling the projector light to pass through the optical lens, gradually converging as a single coherent image on a distant wall. When the user turns the lens barrel 266 in a counterclockwise direction away from the LEDs 262, the barrel cap 271 has a more severe concave curvature, enabling the projected light to pass through all of the optical lenses, sharply converging as a single coherent image on a nearby wall.

Various alternatives and embodiments are contemplated as being within the scope of the following claims particularly pointing out and distinctly claiming the subject matter regarded as the invention.

I claim:

1. An interactive image projecting device, comprising:
   an outer housing;
   a control unit contained within the outer housing;
   a projector mounted within the outer housing and coupled to the control unit, the projector being operable to project an image created by the control unit; and
   a spatial position sensor mounted within the housing and operable to generate a movement signal based upon the movement of the housing, the movement signal being received by the control unit,
   wherein the control unit modifies the image projected by the projector based upon the movement signal such that the image projected by the projector adapts to the movement of the outer housing.

2. The device of claim 1 wherein the spatial position sensor is an accelerometer that detects the movement of the outer housing in at least one spatial direction.

3. The device of claim 2 wherein the accelerometer detects movement of the device in three spatial directions.

4. The device of claim 1 further comprising a wireless transceiver operable to receive and transmit information messages.

5. The device of claim 1 further comprising an image sensor coupled to the control unit and operable to detect the spatial view in front of the housing, wherein the control unit is operable to modify the image projected by the projector based upon the detected spatial view.

6. The device of claim 5 further comprising an illuminating emitter operable to project an illumination light source from the housing, wherein the image sensor is operable to detect the presence of an object positioned in front of the housing and modify the projected image based upon the detected object.

7. The device of claim 6 wherein the illuminating emitter is an infrared emitter.

8. The device of claim 1 further comprising a range locator coupled to the control unit and operable to detect a spatial distance from the image projecting device to a projection surface, wherein the control unit is operable to modify the image projected by the projector based upon the spatial distance to the projection surface.

9. A hand held interactive image projecting device, comprising:
   an outer housing sized to be held by a user;
   a control unit contained within the outer housing;
   a projector mounted within the housing and coupled to the control unit, the projector being operable to project an image created by the control unit from the housing;
   a position indicating emitter coupled to the control unit and operable to project a position indicator from the housing; and
   an image sensor coupled to the control unit and operable to detect the position indicator from another image projecting apparatus, wherein the control unit modifies the image projected by the projector based upon the detected position indicator from another image projecting device.

10. The device of claim 9 wherein the position indicating emitter is an infrared light emitter and the image sensor is an infrared light sensor.

11. The device of claim 9 wherein the image sensor is a CMOS camera or a CCD device.

12. The device of claim 9 wherein the position indicator is anisotropic such that the control unit can determine a rotational orientation of the image projecting device based upon the position indicator.

13. The device of claim 9 further comprising a wireless transceiver operable to receive and transmit information messages from another image projecting device.

14. The device of claim 9 further comprising a spatial position sensor mounted within the housing and operable to generate a movement signal based upon the movement of the housing, the movement signal being received by the control unit,
wherein the control unit modifies the image projected by the projector based upon the movement signal such that the image projected by the projector adapts to the movement of the outer housing.

15. The device of claim 9 wherein the image sensor has a viewing angle that is larger than a projected light angle of the projector.

16. The device of claim 9 further comprising an illuminating emitter operable to project an illumination light source from the housing, wherein the image sensor is operable to detect the presence of an object positioned in front of the housing as illuminated by the illuminating emitter.

17. The device of claim 16 wherein the control unit is operable to modify the image projected by the projector based upon the detected object.

18. The device of claim 16 wherein the illuminating emitter is an infrared light emitter and the image sensor is an infrared light sensor.

19. The device of claim 9 further comprising a range locator coupled to the control unit and operable to detect a spatial distance to a projection surface, wherein the control unit is operable to modify the image projected by the projector based upon the spatial distance to the projection surface.

20. A method of integrating the operation of a first image projecting device and a second image projecting device, comprising the steps of:
generating a first image from a projector of the first image projecting device and a position indicator from a position indicating emitter of the first image projecting device;
operating an image sensor of the second image projecting device to detect the location of the first image based upon the position of the position indicator; and
modifying a second image from a projector of the second image projecting apparatus based upon the determined position of the first image.

21. The method of claim 20 further comprising the steps of:
generating the second image from a projector of the second image projecting apparatus and a second position indicator from a position indicating emitter of the second image projecting apparatus;
operating an image sensor of the first image projecting device to detect the position of the second image based upon the position of the position indicator; and
modifying the first image of the first image projecting device based upon the detected position of the second image.

22. The method of claim 21 further comprising the steps of:
modulating the position indicator generated by the first image projecting device to include information signals regarding the first image;
receiving the modulated position indicator at the second image projecting device; and
modifying the second image based upon the information signal.

23. A hand held interactive image projecting device, comprising:
an outer housing sized to be held by a user;
a control unit contained within the outer housing;
a projector mounted within the housing and coupled to the control unit, the projector being operable to project an image created by the control unit from the housing; and
an image sensor coupled to the control unit and operable to detect a forward spatial view,
wherein the control unit modifies the image projected by the projector based upon the forward spatial view.

24. The device of claim 23 further comprising an illuminating emitter operable to project an illumination light from the housing, wherein the image sensor is operable to detect the presence of an object positioned in front of the housing based upon the illuminating light.

25. The device of claim 24 wherein the illuminating emitter is an infrared light emitter and the image sensor is an infrared light sensor.

* * * * *